United States Patent [19]
Fabris

[11] Patent Number: 5,614,773
[45] Date of Patent: Mar. 25, 1997

[54] GENERATOR SECTION OF A TWO-PHASE FLOW LIQUID METAL MAGNETOHYDRODYNAMIC (LMMHD) GENERATOR

[75] Inventor: Gracio Fabris, Glendale, Calif.

[73] Assignee: California Institute of Technology, Pasedena, Calif.

[21] Appl. No.: 86,438

[22] Filed: Jun. 30, 1993

[51] Int. Cl.$^6$ .................................................. H02K 44/12
[52] U.S. Cl. .............................................................. 310/11
[58] Field of Search ................................................. 310/11

[56] References Cited

U.S. PATENT DOCUMENTS

| | | | |
|---|---|---|---|
| 4,047,094 | 9/1977 | Rosa | 322/7 |
| 4,151,423 | 4/1979 | Hendel | 290/42 |
| 4,180,752 | 12/1979 | Gorlin et al. | 310/11 |
| 4,218,629 | 8/1980 | Kayukawa et al. | 310/11 |
| 4,260,913 | 4/1981 | Bitjurin et al. | 310/11 |
| 4,317,057 | 2/1982 | Bazarov et al. | 310/11 |
| 4,328,436 | 5/1982 | Biblarz et al. | 310/11 |
| 4,388,542 | 6/1983 | Lee et al. | 310/11 |
| 4,430,588 | 2/1984 | Way et al. | 310/11 |
| 4,450,361 | 5/1984 | Holt | 290/1 R |
| 4,454,436 | 6/1984 | Last et al. | 310/11 |
| 4,608,627 | 8/1986 | Holt | 363/131 |
| 4,847,525 | 7/1989 | Sukoriansky et al. | 310/11 |
| 5,026,681 | 6/1991 | Hed | 505/1 |
| 5,091,118 | 2/1992 | Burgher | 261/76 |
| 5,236,649 | 8/1993 | Fabris | 415/80 |

OTHER PUBLICATIONS

Fabris, B., and R.G. Hantman, "Interaction of Fluid Dynamics Phenomena and Generator Efficiency in Two–Phase Liquid–Metal Gas Magnetohydrodynamic Power Generators," *Energy Conversion and Management: An International Journal* 21:49–60, 1981 (month unknown).

Fabris, G., and E.S. Pierson, "The Role of Interfacial Heat and Mechanical Energy Transfers in a Liquid–Metal MHD Generator," *Energy Conversion: An International Journal*, 19:101–118, 1979 (month unknown).

Fabris, G., "Formulation of the Slip Loss in a Two–Phase Liquid–Metal Magnetohydrodynamic Generator," *Progress in Astronautics and Aeronautics* 84:218–224, 1983 (month unknown).

Fabris, G. et al., "Two–Phase Flow Bubbly Mixing for Liquid Metal Magnetohydrodynamic Energy Conversion," *Proceedings of the 25th Intersociety Energy Conversion Engineering Conference* 2:486–493, Reno, Nevada, 1990 Aug.

Fabris, G., "Discussions on Liquid Metal Magnetohydrodynamics," *Proceedings of the 6th International Conference on Magnetohydrodynamics Electric Power Generation* VI:427 Washington, DC, 1975 Jun.

Tanatugu, N. et al., "Electrical Conductivity of Liquid Metal Two–Phase Mixture in Bubbly and Slug Flow Regime," *Journal of Nuclear Science and Technology* 9(12):57–59, Dec. 1972.

(List continued on next page.)

Primary Examiner—Steven L. Stephan
Assistant Examiner—Judson H. Jones
Attorney, Agent, or Firm—Seed and Berry LLP; David V. Carlson

[57] ABSTRACT

Two-phase LMMHD energy conversion systems have potentially significant advantages over conventional systems such as higher thermal efficiency and substantial simplicity with lower capital and maintenance costs. Maintenance of low velocity slip is of importance for achieving high generator efficiency. A bubbly flow pattern ensures very low velocity slip. The full governing equations have been written out, and a computer prediction code has been developed to analyze performance of a two-phase flow LMMHD generator and nozzle under conditions of no slip. Three different shapes of an LMMHD generator have been investigated. Electrical power outputs are in the 20 kW range. Generator efficiency exceeds 71 percent at an average void fraction of about 70 percent. This is an appreciable performance for a short generator without insulating vanes for minimizing electrical losses in the end regions.

21 Claims, 21 Drawing Sheets

OTHER PUBLICATIONS

Gherson, P. et al., "Analytical Study of End Effects in Liquid Metal MHD Generators," School of Nuclear Engineering, Dept. of Mathematical Science, Purdue Univ., Lafayette, IN, 1978, pp. 590–594 (month unknown).

Branover, H., *Magnetohydrodynamic Flow in Ducts*, John Wiley & Sons, New York, 1978. pp. 49–56, 71–102, 241–271 (month unknown).

Moszynski, J.R., "Reduction of Electrical End Losses in MHD Generator Channels by Insulating Vanes," Argonne National Laboratory, Report 7188, 1967 Sep.

Fabris, G., and L. Back, "Prediction of Performance of Two–Phase Flow Nozzle and Liquid Metal Magnetohydrodynamic (LMMHD) Generator for No Slip Condition," Jet Propulsion Laboratory, Calif. Institute of Technology, Aug. 5, 1992.

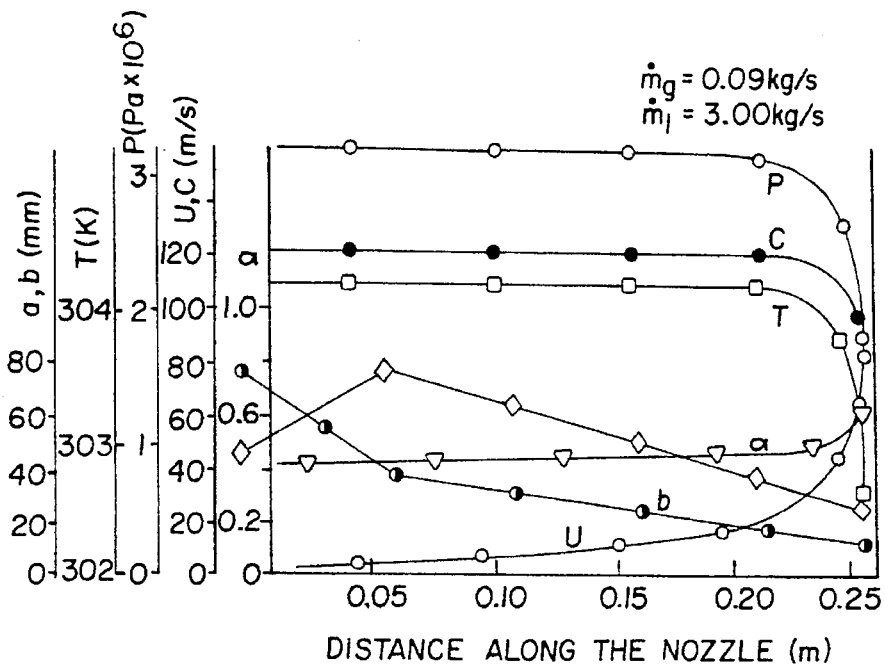
FIG. 7 Variation of Flow Properties for the Two-Phase Nozzle.
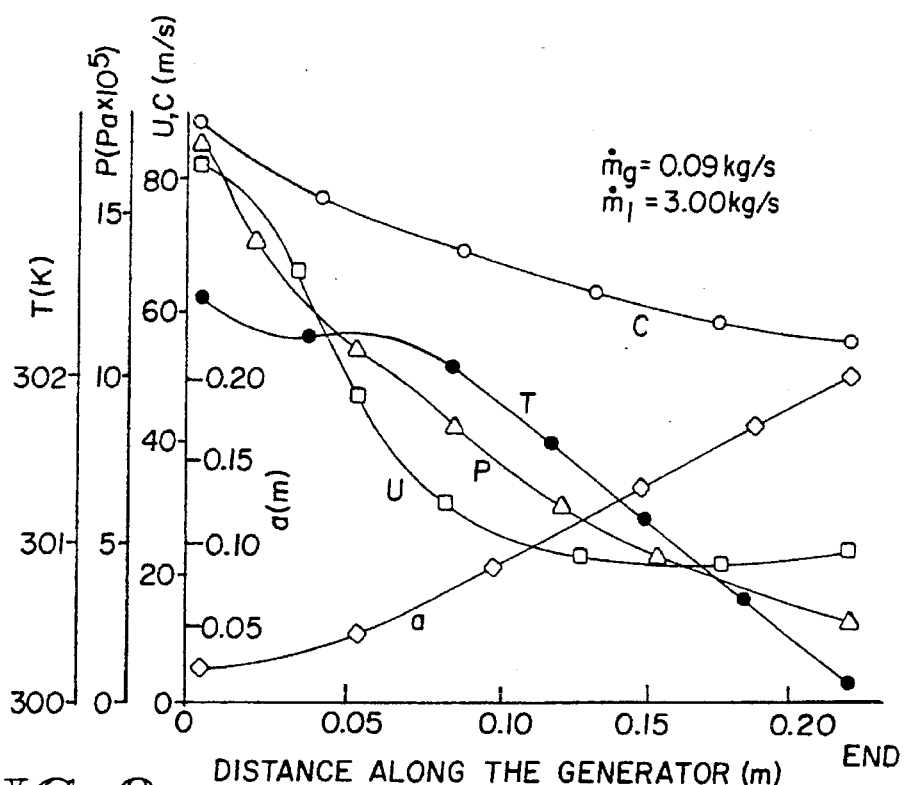
FIG. 8 Variation of Flow Properties for the Two-Phase LMMHD Generator.

DISTANCE ALONG THE GENERATOR (m)

Variation of other Properties for the Two-Phase LMMHD Generator.

5,614,773

GENERATOR SECTION OF A TWO-PHASE FLOW LIQUID METAL MAGNETOHYDRODYNAMIC (LMMHD) GENERATOR

TECHNICAL FIELD

This invention relates to liquid metal magnetohydrodynamic generators and, more particularly, to the specific shape of a generator section of an LMMHD generator providing improved efficiency over prior art generator sections.

BACKGROUND OF THE INVENTION

Two-phase flow liquid metal magnetohydrodynamic (LMMHD) systems have a number of significant potential advantages over conventional or other energy conversion systems.

First, the thermal efficiency of LMMHD systems is close to the Carnot cycle efficiency due to substantial reheat of the expanding gas by the coflowing liquid metal. In this way the expansion of the gas is almost isothermal.

Second, an LMMHD system has minimal or no moving parts. This makes such a system considerably less expensive to manufacture and maintain. In addition, absence of highly stressed high temperature moving parts (such as blades in thermal turbines) should permit increasing the top operating temperature without appreciable additional costs. In this way, thermal efficiencies could be raised by an additional ten percentage points or more. Combined with the first advantage this means that LMMHD systems could potentially produce 50 percent more electrical energy from the same heat source than conventional systems.

A third advantage is that LMMHD systems can operate over a large temperature range, i.e., from 300 to 3000K. This means that they are suitable for a variety of heat sources such as waste heat, cogeneration or conventional fuels as usual or at higher temperatures.

The fourth advantage is the very high electrical conductivity ($10^5$ to $10^6$ mho/m).

The fifth advantage is that a wide range of power sizes are possible, from a few kW to several hundred MW.

Fabris, G. and Hantman, R.G., "Interaction of Fluid dynamics Phenomena and Generator Efficiency in Two-Phase Liquid-Metal Gas Magnetohydrodynamic Power Generators," *Energy Conversion and Managment an International Journal* 21:49–60, 1981, and Fabris, G. and Pierson, E. S., "The Role of Interfacial Heat and Mechanical Energy Transfers in a Liquid-Metal MHD Generator," *Energy Conversion an International Journal* 19:101–118, 1979, have discussed the need to operate an LMMHD generator efficiently at a high void fraction in order to fully realize the potential advantages of LMMHD systems. In the past, the main cause of a decrease of the LMMHD generator efficiency was the slip loss (Fabris, G., "Formulation of the Slip Loss in a Two-Phase Liquid-Metal Magnetohydrodynamic Generator," *Progress in Astronautics and Aeronautics* 84: 218–224, 1983) which occurred due to the transition of a two-phase flow pattern from bubbly to churn turbulent flow at higher void fractions. An improper flow pattern could be created by a poorly designed two-phase flow mixer.

Proper design of the mixer is discussed by Fabris, G., Kwack, E., Harstad, K., and Back, L. H., "Two-Phase Flow Bubbly Mixing for Liquid Metal Magnetohydrodynamic Energy Conversion," *Proceedings of the 25th Intersociety Energy Conversion Engineering Conference,* 2:486–493, Reno, Nev., 1990. It was shown that a properly designed mixer can create a low slip homogenous bubbly flow pattern at high void fractions. Another major cause of an improper flow pattern is coalescence of bubbles away from the mixer.

Fabris, G., "Discussions on Liquid Metal Magnetohydrodynamics," Proceedings of the 6th International Conference on *Magnetohydrodynamics Electric Power Generation VI:* 427, Washington, D.C., 1975, was the first to suggest that the surface activity of liquid metals can be used to prevent coalescence of bubbles and therefore to maintain a bubbly flow pattern at much higher void fractions. In this way, very significant improvements in the performance of an LMMHD generator can be obtained over earlier experimental results.

SUMMARY OF THE INVENTION

According to principles of the present invention, an improved generator section in an LMMHD generator is provided having higher efficiencies than was previously obtained. The shape of the generator section is specifically selected to provide an improved flow of the two-phase fluid, thus increasing the overall efficiency of the generator section.

It is believed that a rapid, large expansion (large pressure ratio) of a homogeneous bubbly flow can also contribute significantly to maintenance of such an appropriate flow pattern at higher void fractions. It is known that even traces of surfactants can induce transient foaming, i.e., coalescence of bubbles is prevented for a short period of time which is comparable to the residence time of two-phase flow within an LMMHD generator. For rapidly expanding bubbles, instantaneous concentration of additive and surface tension around the bubbles will be nonuniform as needed for prevention of the coalescence of bubbles. In addition, during the substantial expansion under significant pressure drop there will be large heat transfer from the liquid metal to expanding gas bubbles. This heat transfer will produce a nonuniform distribution of temperature of the interface around the gas bubbles. Where a liquid metal layer next to a gas interface is thinner, the temperature will be lower. The lower temperature means locally higher surface tension which helps to maintain thinner liquid layers separating adjacent bubbles.

One goal of the present invention is to provide a bubbly, low slip, two-phase flow in an LMMHD generator section. High void fractions can be achieved while maintaining a bubbly foam flow pattern using the generator section having a shape designed according to the present invention.

BRIEF DESCRIPTION OF THE DRAWINGS

FIG. 7 is a graph illustrating the variation of various flow properties predicted for the two-phase nozzle along the length of the nozzle.

FIGS. 8 and 9 are graphs illustrating the variation of flow properties predicted for the two-phase LMMHD generator along the length of the generator according to a first computer program.

DETAILED DESCRIPTION OF THE INVENTION

Figure 1:
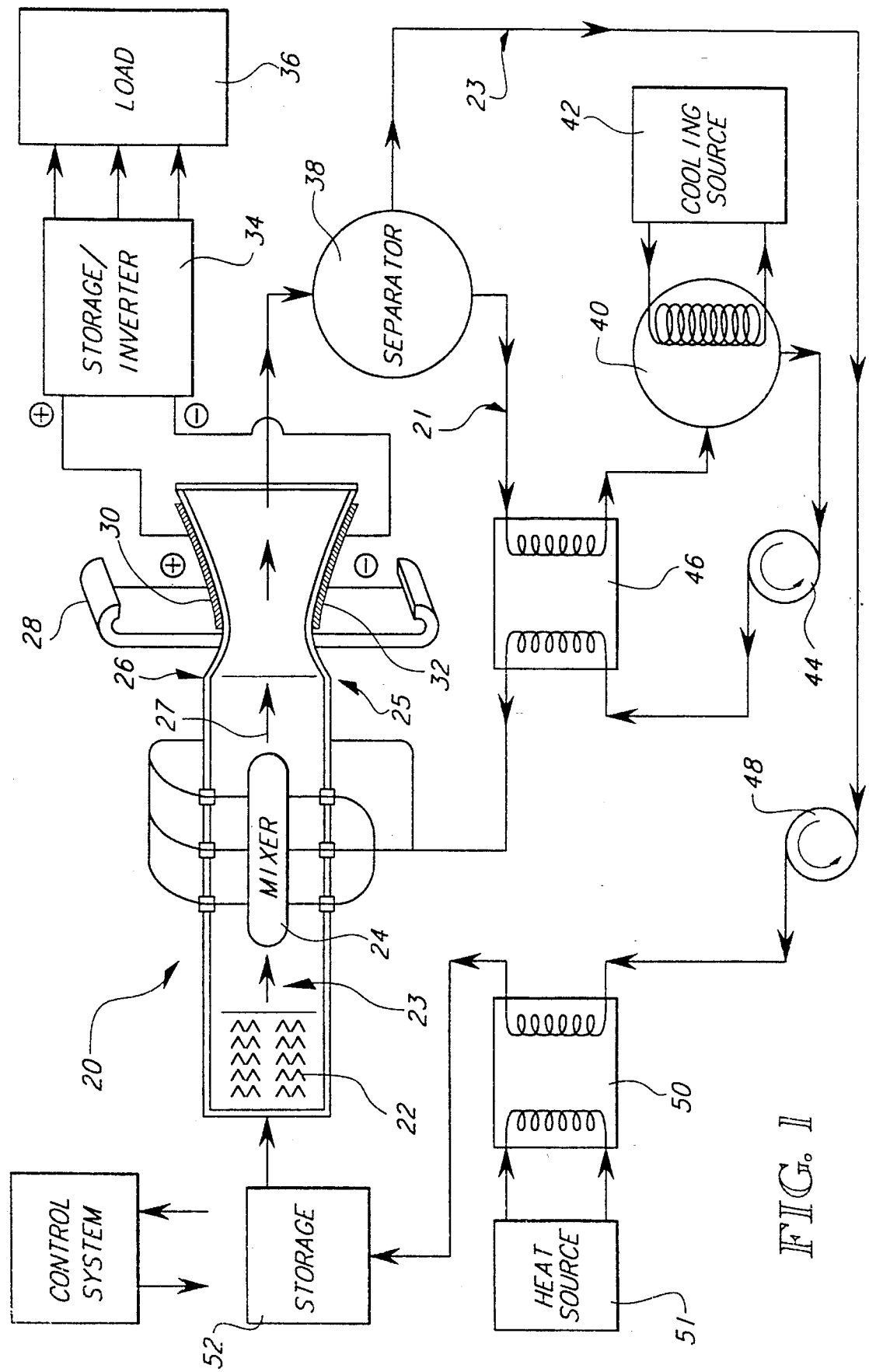
FIG. 1 is a block diagram view of the overall system of an LMMHD generator for generating electricity.

A system schematic of a liquid, metal magnetohydrodynamic generator, LMMHD, is illustrated in FIG. 1. The schematic of FIG. 1 is intended to show the overall system in which the invention operates, and not to illustrate the specific features of the invention and thus is provided as an example of the environment in which the invention operates. Certain aspects of this invention were described in a publication by the present inventor published less than a year ago, on or about Aug. 5, 1992, titled "Prediction of Performance of Two-Phase Flow Nozzle and Liquid Metal Magnetohydrodynamic (LMMHD) Generator for No Slip Condition," by G. Fabris and L. Back, Jet Propulsion Laboratory, California Institute of Technology, Pasadena, Calif. 91109.

As shown in FIG. 1, an LMMHD generator 20 includes a honeycomb section 22, a mixer section 24, a nozzle section 25, and a generator section 26. Liquid metal 23 moves from the honeycomb section 22, through the mixer section 24, where it is injected with a gaseous mixture to form a two-phase flow 27. The mixer section is preferably of the type described in publication by Fabris et al. in 1990 titled "Two-Phase Flow Bubbly Mixing for Liquid- Metal Magnetohydrodynamic Energy Conversion," previously discussed herein.

The two-phase flow 27 then passes through the nozzle section 25 and then the generator section 26. A magnet 28 is adjacent the generator section 26 so that an electric current is generated in the two-phase flow 27 as it passes through the magnetic field created by the magnet 28 within the generator section 26. Electrodes 30 and 32 of the generator section 26 are connected to the appropriate storage device or inverter 34 so that the electric power generated in the generator section 26 may be used to drive a load 36 or stored for use at a later time to drive the load 36.

After the two-phase flow 27 exits from the generator section 26, it enters a separator 38 in which the gas 21 is separated from the liquid metal 23. The gas 21 then passes through the appropriate stages which may, if desired, include a condenser stage 40, having the associated cooling stage 42, a liquid pump 44 and a regenerator section 46 prior to it being injected into the fluid 23 in the mixer section 24 of the LMMHD generator. Similarly, the liquid metal 23 passes through the appropriate stages for reuse, which may, if desired, include an electromagnetic pump 48, a heat exchanger 50, a storage tank 52 and the appropriate tubing for delivery to the honeycomb section 22 for reuse in the LMMHD generator.

FIG. 1 illustrates a sample LMMHD generator cycle that is useful with this invention. The overall cycle is well known in the art and shown in prior patents, including U.S. Pat. No. 4,388,542 to Lee et al. and U.S. Pat. No. 4,847,525 to Sakoriansky et al., by way of example, both of which are incorporated herein by reference. It will be understood that the cycle with which this invention may be used may include additional components as is presently known in the art, or may not require certain components, such as pumps 44 and 48, but instead other techniques for circulation of the fluids may be used, as is well known in the art today.

The invention is generally directed towards an inventive shape for the generator section 26 of the LMMHD generator, as will now be explained in more detail.

According to principles of the invention, the shape of the generator section 26, within which the fluid undergoes expansion while electricity is being generated, is a factor that contributes to the overall efficiency of the LMMHD generator 20. It is therefore desirable to provide a generator section 26 which has a maximum efficiency for converting the kinetic energy in the moving two-phase flow 27 to electrical energy that is then used by the load 36.

In determining the shape of the generator section which is most advantageous for providing an efficient conversion of kinetic energy to electrical energy, numerous equations are helpful in arriving at a preferred design. Many of the equations require that certain assumptions be made or approximations be made to aid in arriving at a preferred design for manufacture and actual use in generating electricity.

It is assumed that there is no-slip between the gas and the liquid in the two-phase flow. In high velocity foam flow, the velocity ratio is quite close to unity since the slip velocity is only a small fraction of the fluid flow velocities. This means that for such flows in the inventive generator section, the no-slip assumption is a very good approximation of reality. Besides the no-slip approximation, additional assumptions are that the flow is steady and one-dimensional, that heat transfer between the gas and liquid is perfect and there is no heat exchange with the surroundings (adiabatic condition), and that the flow is vertically upwards. These assumptions simplify the equations considerably.

The assumption of no gas-to-liquid velocity gives $$u_g = u_l = U \quad (1)$$

The continuity equation can be written as $$A = \frac{\dot{m}_g}{\rho_g U_g} + \frac{\dot{m}_l}{\rho_l U_l} = \left(\frac{\dot{m}_g}{\rho_g} + \frac{\dot{m}_l}{\rho_l}\right)\frac{1}{U} \quad (2)$$

The local cross-section of the LMMHD generator duct is $$A = ab \quad (3)$$

where $$a = a(x) \quad (4)$$

is the distance between the electrodes and $$b = b(x) \quad (5)$$

is the width of the LMMHD generator. X is the position along the length of the generator section, so that a(x) is the distance between the electrodes duct at position x, and b(x) is the width of the MHD generator at position x, and A(x) is the cross-sectional area at position x along the duct of the LMMHD generator.

$$B = B(x) \quad (6)$$

is the applied magnetic field strength. An assumption is $$B_i = 0, \quad (7)$$

i.e., the induced magnetic field is eliminated by compensating bus bars. The liquid density is $$\rho_l = \text{constant} \quad (8)$$

The gas density, assuming an ideal gas, is $$\rho_g = \frac{P}{R_g T} \quad (9)$$

The current density is $$J = \sigma\left(U_l B - \frac{E_{el}}{a}\right) \quad (10)$$

where the electrical conductivity of the two-phase flow is given by Maxwell's equation, as explained in Tanatugu, N., Fujii-e, Y., Suita T., "Electrical Conductivity of Liquid Metal Two-Phase Mixture in Bubbly and Slug Flow Regime," *J. of Nuclear Science and Technology* 9(12):57–59, 1972, assuming spherical gas bubbles $$\sigma = \sigma_l \frac{2(1-\alpha)}{2+\alpha} \quad (11)$$

The local void fraction in no-slip flow is $$\alpha = \frac{\frac{\dot{m}_g}{\rho_g U}}{\frac{\dot{m}_g}{\rho_g U} + \frac{\dot{m}_l}{\rho_l U}} = \frac{\frac{\dot{m}_g}{\rho_g}}{\frac{\dot{m}_g}{\rho_g} + \frac{\dot{m}_l}{\rho_l}} \quad (13)$$

The generator local electrical load factor is $$K = \frac{E_{el}}{U_l B a} \quad (14)$$

where $E_{el}$ is the voltage drop across the electrodes. The generator overall load factor is $$K_G = \frac{E_{el}}{(U_l B a)_G} = \frac{1}{1 + \frac{R_i}{R_L} + \frac{R_i}{R_e}} \quad (15)$$

where $$(U_l B a)_G = R_i \int_o^L \sigma U B b \, dx \quad (16)$$

is the weighed induced voltage for the entire generator and where $$R_i = \frac{1}{\int_o^L \frac{\sigma b}{a} dx} \quad (17)$$

is the internal LMMHD generator electrical resistance.

Also, $R_L$ is the external load resistance and $R_e$ is the electrical resistance in the end regions. (18)

The momentum equation is $$-A dp - JBA\, dx - f dx - [\rho_g \alpha + \rho_l(1-\alpha)] g A\, dx = \quad (19)$$
$$(\dot{m}_g + \dot{m}_l) U \big|_x^{x+dx}$$

where f is the MHD wall friction force per unit of length.

The assumption is that there is no heat exchange with the surroundings.

It is also assumed that there is perfect heat transfer between the liquid and gas.

That is, $$T_l = T_g = T \quad (20)$$

The total energy equation for one dimensional flow can be determined from various known publications and is given by:

$$-\frac{\partial}{\partial x}\left[\rho UA\left(e + \frac{U^2}{2}\right)\right] - (F_g + F_{MHD})AU \quad (21)$$
$$-\frac{\partial}{\partial x}(\tau_{xx} AU) + WA = 0$$

where $F_g = g\rho$, is the gravitational body force/volume, $F_{MHD} = JB$, is the Lorentz body force/volume, $W = J^2/\sigma$, is the energy source term, i.e., generation of heat/volume due to ohmic heating, $$\tau_{xx} = -p + 4/3\, \mu \frac{dU}{dx}$$

is the normal stress.

The flow work term p/ρ in the normal stress relation can be combined with the internal energy e to get the specific enthalpy h. For a two-phase flow of an ideal gas and an almost incompressible liquid, the enthalpy change of the mixture is $$dH = (\dot{m}_g c_{pg} + \dot{m}_l c_{pl})dT + \frac{\dot{m}_l}{\rho_l}(1 - \beta T)db \quad (22)$$

where $$\beta = 1/v \left( \frac{\partial v}{\partial T} \right)_p$$

is the coefficient of volume expansion.

The term $\beta T$ is negligibly small for NaK and therefore is neglected compared to 1. (Of course, other metals besides NaK can be used for the liquid metal, such as folder, etc. and the proper coefficients will be used for the liquid metal being used.)

In addition, the normal viscous stress, $$4/3 \, \mu \frac{dU}{dx},$$

was taken to be small compared to the pressure p which is usually the case.

The total energy equation can then be written as $$\left[ (\dot{m}_g c_{pg} + \dot{m}_l c_{pl})T + \dot{m}_l \frac{1}{\rho_l} p + (\dot{m}_g + \dot{m}_l)\frac{U^2}{2} \right]_x^{x+dx} = \left\{ -U(JB + g\rho) + \frac{J^2}{\sigma} \right\} A dx \quad (23)$$

where specific heats are $$c_{pg} = c_{pg}(p,T) \text{ given} \quad (24)$$

$$c_{pl} = c_{pl}(p,T) \text{ given} \quad (25)$$

$\mu$ is the viscosity of the two-phase fluid.

The friction factor is defined in Ref. 8 as $$\lambda = -\frac{\frac{dp}{dx}}{\frac{\rho U^2}{b}} \quad (26)$$

For LMMHD flow at high Hartmann numbers (Ha), $$\lambda = \frac{2Ha}{Re} \quad (27)$$

where the Hartmann number is $$Ha = Bb \left( \frac{\sigma}{\rho v} \right)^{1/2} \quad (28)$$

and the Reynolds number Re $= Ub/v$. See Branover, H., "Magnetohydrodynamic Flow in Ducts," John Wiley & Sons, New York, 1978.

Since most friction and ohmic "shunt" dissipation occur in very thin boundary layers which in this case are mostly composed of liquid, assuming the liquid is NaK, we will assume for this purpose only $$v = v_{NaK} \quad (29)$$

$$\sigma = \sigma_{NaK} \quad (30)$$

Now, the friction force per unit of length is $$f = \lambda \frac{\rho U^2}{b} A \quad (31)$$

where $$\lambda = 2\frac{Bb \left( \frac{\sigma}{\rho v} \right)^{1/2}}{\frac{Ub}{v}} = 2\frac{B}{U}\left( \frac{\sigma v}{\rho} \right)^{1/2} \quad (32)$$

End loss electrical resistances are calculated as described in Gherson, P. and Lykoudis, P. S., "Analytical Study of End Effects in Liquid Metal MHD Generators," Report, Purdue University, West Lafayette, Ind., 1978, and Moszynski, J. R, "Reduction of Electrical End Losses in MHD Generator Channels by Insulating Vanes," Argonne National Laboratory, Report 7188, 1967. The end resistances formulas are based on e-folding, i.e. exponential extension of applied magnetic field beyond the end of the electrodes. At the inlet, e-folding is equal to $4a$ where a is the local distance between the electrodes. In this way the inlet end resistance is to be obtained as:

$$R_{e1} = 50 \frac{1}{\sigma_{in} b_{in}} \quad (33)$$

By the same token at the outlet, e-folding is equal to a, so that the outlet end resistance is $$R_{e2} = 11 \frac{1}{\sigma_{out} b_{out}} \quad (34)$$

The prior equations 1–34 are useful in determining the preferred shape of the two-phase flow nozzle and LMMHD generator sections. A computer program has been developed which uses these equations to predict the performance of a two-phase nozzle and LMMHD generator under the no-slip condition. The flow chart for the computer program is shown in FIGS. 19A–19D. The flow chart itself is self explanatory from the overall description provided herein.

Four slightly different versions of the computer prediction code have been written. One version predicts flow through the nozzle which connects the mixer and the LMMHD generator. In this case all the MHD terms in the equations are deleted in the nozzle. The second version of the code predicts flow along the LMMHD generator with prescribed velocity distribution along the generator as an input and with distance a(x) between the electrodes as one of the outputs. The third version is the same as the second version but the distance between the electrodes is a prescribed input while the velocity distribution along the LMMHD generator is an output. The fourth version of the computer code is identical to the third version but the calculations are initiated from the exit of the LMMHD generator and then the calculations are carried out by marching upstream. This was done to immediately obtain the desired exit pressure from the generator. In most calculations, the exit pressure has been taken to be equal to 2 bars.

Figure 2:
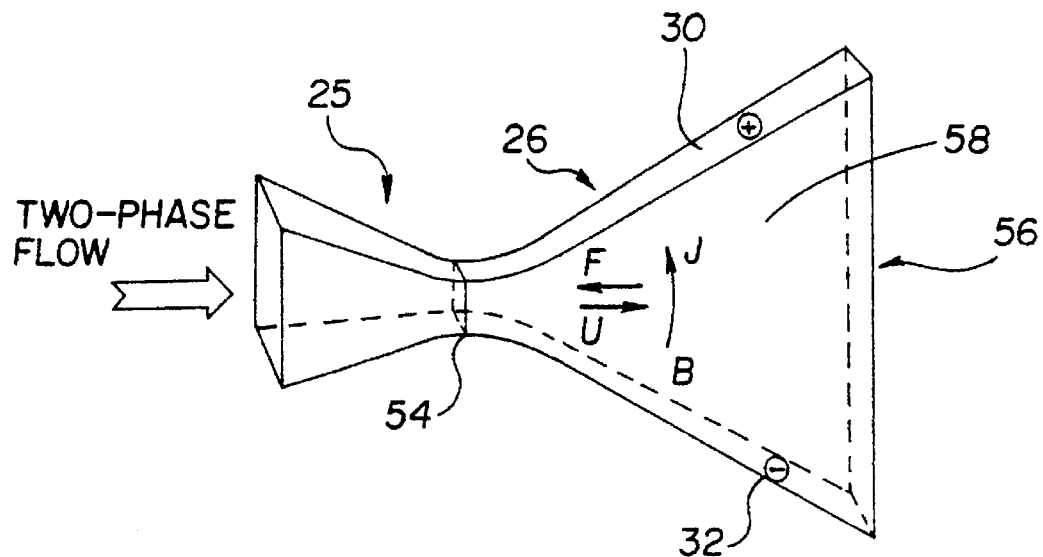
FIG. 2 is an isometric view of the nozzle section and generator section having a shape designed according to principles of the present invention.

FIG. 2 illustrates the two-phase flow nozzle and LMMHD generator configuration. Spacing a(x) between the electrodes and b(x) between the insulating walls are indicated at the exist of the generator.

The cross-sectional area of the nozzle are rectangles which decrease in size along the flow. In the MHD generator, the cross-sectional area rectangles increase along the flow. This design was chosen in order to increase the velocity at the entrance of the generator, thus considerably increasing local power density and decreasing length and size of the generator. The design also decreases residence time of the two-phase flow in the nozzle and generator, thus increasing chances of maintaining a desired low slip foam flow pattern at high void fractions. In one embodiment, there is a straight channel extending between the nozzle and the generator section, though not shown in FIG. 2. This straight channel may be short, 2–5 cm, or not present, depending on the design.

FIG. 2 also indicates directions of the fluid velocity U, applied magnetic field B, induced current J, and the Lorentz force F opposing fluid motion.

Figure 3:
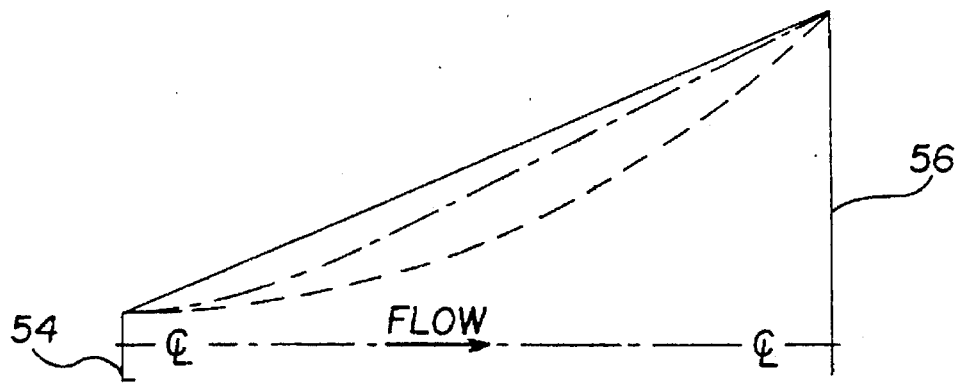
FIG. 3 is a side, elevational view of alternative embodiments for the shape of the walls of the generator expansion chamber.

Three shapes of the LMMHD generator have been considered, as shown in FIG. 3. In one embodiment, all three generators have the same distribution of distance (b) between the insulating walls which changes linearly from 5 mm at the inlet to 10 mm at the outlet.

The distance (a) between the electrodes at the inlet 54 and the outlet 56 is the same for each of the three shapes. Specifically, in one preferred embodiment the distance (a) between the electrodes at the inlet is 20 mm and the distance (a) between the electrodes at the outlet 56 is 200 mm. This is based on a total length of the generator section of 220 mm and the electrodes 30 and 32 extending from the inlet 54 to the outlet 56. The distance (a) between the duct walls formed by the electrodes varies according to three different shapes along the length of the duct, as explained herein. One shape is a straight line generator expansion from the inlet to the outlet. This results in a purely linear expansion of the duct.

As shown in FIG. 3, the second shape is a circular arc of radius R =0.313 m. The arc avoids an abrupt change of the wall slope at the generator inlet. The radius of the circular arc for the second shape is based on the duct 58 having an inlet distance of 20 mm, an outlet distance of 200 mm and an overall length of 220 mm. A circular arc of this radius crosses exactly through the two points that form the inlet and the outlet, thus providing a single continuous radius from the inlet to the outlet. Of course, for different inlet, outlet, or length dimensions, the radius of the circular arc will be different, and is appropriately chosen such that the arc continues as a single smooth curve from the inlet to the outlet.

As shown in FIG. 3, the third shape uses an arc of smaller radius (R =0.15 m) at the generator inlet, and then continues with a straight line all the way to the outlet. The radius of the circular arc for the third shape is selected such that the radius is less than that which will provide a single arc between the inlet and the outlet. According to a preferred embodiment of the third shape, the circular arc begins approximately at the inlet and continues as an arc for a selected distance. A straight channel may also be at the inlet, as explained with respect to FIG. 2. At the point where the tangent to the arc is aligned in a straight line with the exit location at the outlet 56, the shape transitions from the circular arc to a straight line and continues as a straight line from that point to the outlet 56.

Predictions indicate that the third shape appears to be the most reasonable. The straight line shape has a too abrupt change of cross-sectional shape at the inlet with predictions indicating too rapid slowing down of the local velocity and local pressure increases. It is known from experimental experience that pressure increases usually cause flow separation and leads to decreased generator efficiency.

Figure 4:
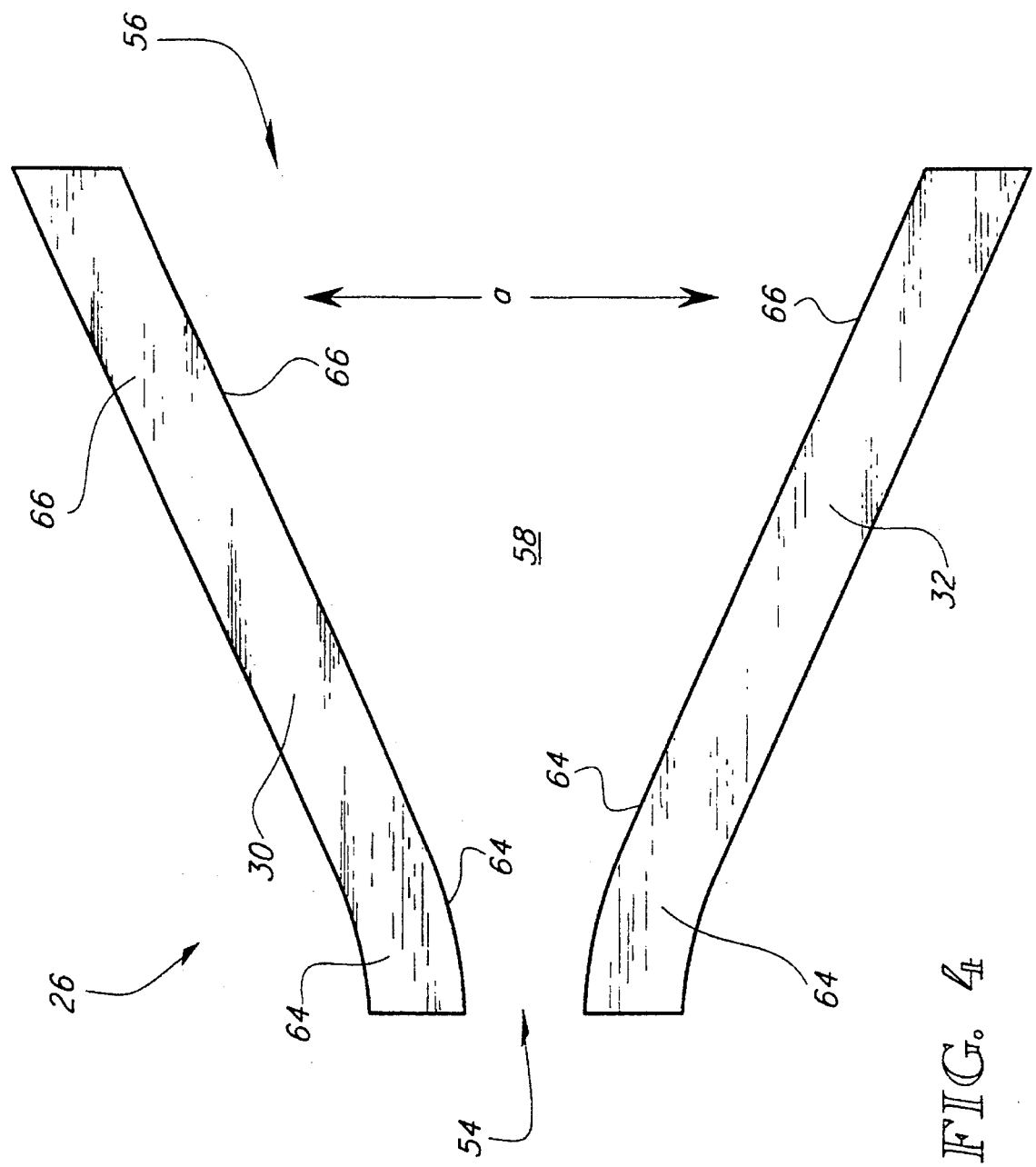
FIG. 4 is a side elevational view of the electrodes which are in contact with the two-phase flow and form two walls of the duct of the generator section.
Figure 5:
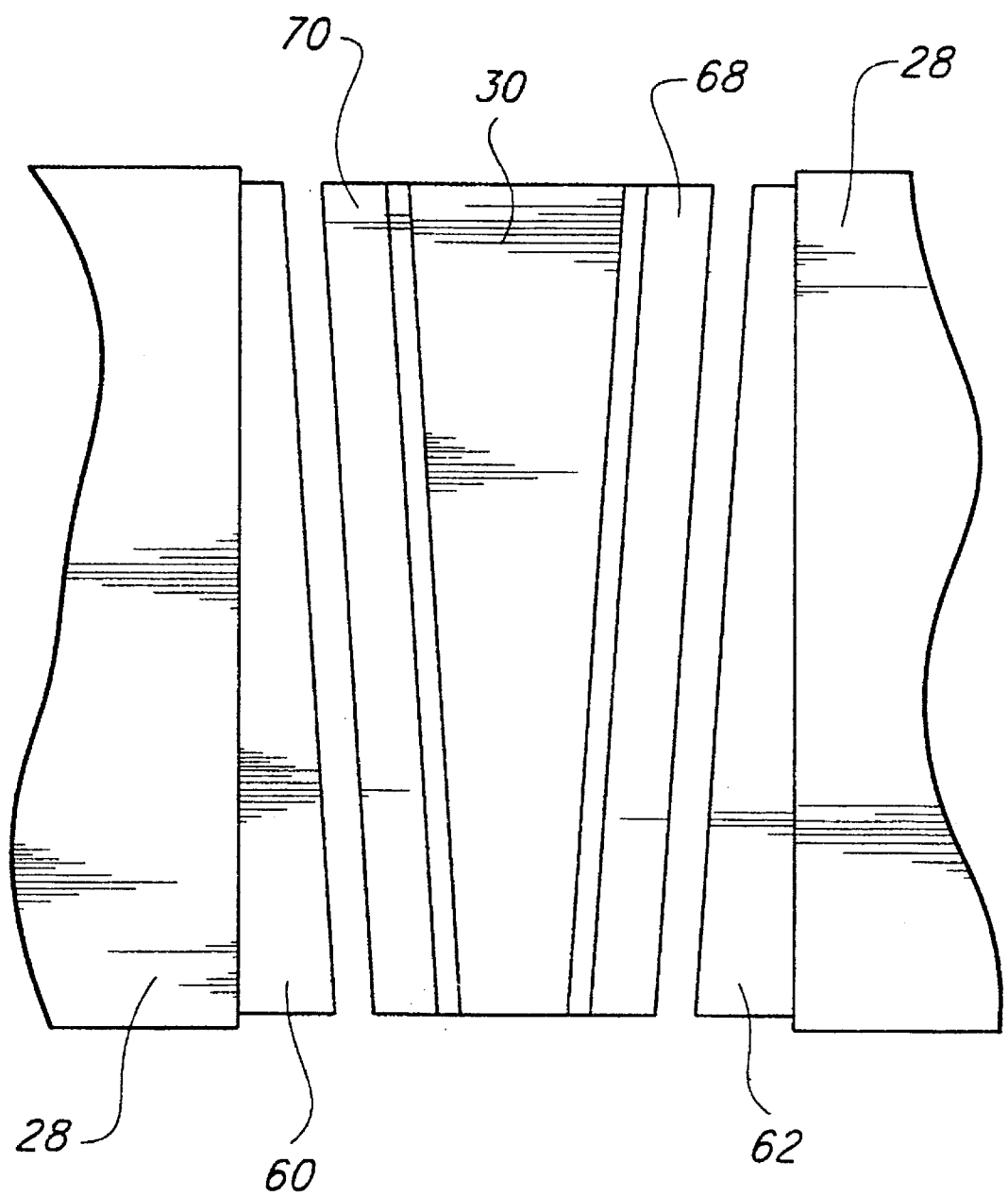
FIG. 5 is a simplified, top plan view of the generator section of FIG. 6A.

FIGS. 4 and 5 illustrate the preferred shape of electrodes which form walls of the duct 58 of the generator section 26, as will now be explained. Each of the electrodes 30 and 32 includes a surface portion 64 having the shape of a circular arc of radius adjacent the inlet of the duct 58. After the circular arc of radius, shape 64, the shape of the electrode 30 transitions to a portion 66 having a straight line shape. Two of the walls that form the duct 58 are the electrodes 30 and 32. Thus, having the face of the electrodes form a circular arc 64 along the surface facing the duct creates a duct having walls with a circular arc of radius facing each other and expanding outward at the same time. This results in a duct having a nonlinear increase in the distance between the walls of the duct for that portion of the duct in which the electrodes have the shape of a circular arc of radius. After the portion 64 transitions from a circular arc of radius to a straight surface portion 66, the duct expansion region transitions to a linear expansion.

According to principles of the invention, at least a portion of the duct has a nonlinear expansion region through which a magnetic field is applied for the generation of electricity. This provides a nonlinear expansion region within the duct as the distance between the electrodes 30 increases nonlinearly during that portion. Of course, for that shape in which a circular arc of radius extends from the inlet to the outlet, the nonlinear expansion of the duct continues for the entire length of the duct. In other embodiments, such as that shown in FIG. 4, the circular arc of radius of the electrodes 30 and 32 extends only for a selected portion along the length of the duct 58 and at some point within the duct 58 transitions to a straight line resulting in a linear expansion of the duct. The length of the circular arc of radius portion 64 and the radius of the arc is selected based on many factors, including the overall length of the duct, the distance between the electrodes at the inlet and the outlet, and other parameters. For the specific embodiment described herein, a radius of the circular arc of 150 mm has been found preferred.

Of course, the electrodes themselves do not necessarily need to form the walls of the duct 58. While this is preferred, an embodiment in which the duct 58 is formed by four walls having the shape as described herein and in which the electrodes are separate segments, or different pieces, which contact the fluid to draw the current from the fluid, are acceptable designs. For example, the electrodes may be simple shafts or segments which come in contact with the fluid such that the electrodes themselves do not have the circular arc of radius, but the duct does have a circular or nonlinear expansion region formed by walls that are not electrodes.

Electrodes 30 and 32 are shown as solid electrodes which continue as integral members from the inlet 54 to the outlet 56 of the duct 58. While this is the shape of the electrodes in one embodiment, it will be appreciated that some LMMHD generators use electrodes that are in segments and having insulators therebetween as described in U.S. Pat. Nos. 4,218,629, 4,047,094, 4,180,752, and 4,260,913 all of which are incorporated herein by reference The bolt holes through the electrodes are not shown for simplicity in understanding the shape. In addition, the electrodes 30 and 32 do not necessarily need to extend along the entire length of the duct 58. Rather, in some embodiments they extend along only a portion of the length of the duct 58 and the remainder of the duct 58 is formed by walls which do not constitute the electrodes.

FIG. 5 illustrates the change in width of the electrodes 30 and 32 from the inlet 54 to the outlet 56. The bolts 72 are not shown for ease of illustrating the invention. According to one embodiment, the width of the electrodes increases linearly, from approximately 5 mm to approximately 10 mm from the outlet to the inlet. The cross-sectional area of the duct thus increases based on changes in both the width of the electrode and the distance between the electrodes, the cross-sectional area being determined by the product of the width (b) of the duct and the height (a) of the duct.

Figure 6A:
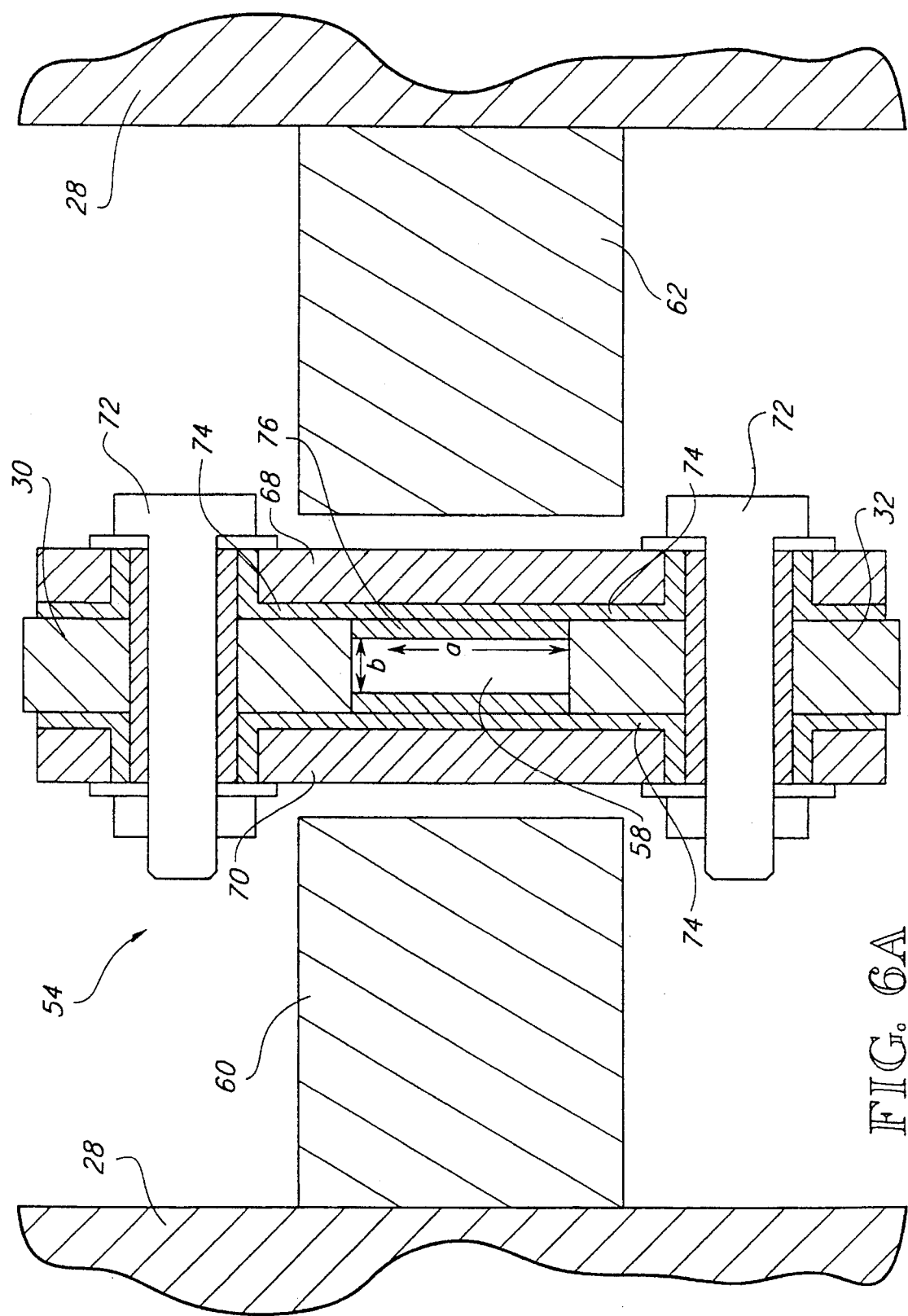
FIG. 6A is a cross-sectional view of a first embodiment taken along lines 6—6 of FIG. 1 at the inlet of the generator section duct.

FIG. 6A illustrates a cross-sectional view of a first embodiment of the inlet portion of the duct 58 taken along lines 6—6 of FIG. 1. The duct 58 is composed of a pair of support sidewalls 68 and 70, and electrodes 30 and 32.

Preferably, the support sidewalls 68 and 70 are composed of a nonmagnetic metal, such as aluminum, and the electrodes 30 and 32 are constructed of a highly conductive, nonmagnetic metal, such as copper. Bolts 72 extend through the support sidewall 68, through the copper electrodes 30 and 32, and through the other support sidewall 70 to firmly clamp the electrodes 30 and 32 in position and form the duct 58. The appropriate insulating layers 74 are provided between the support sidewalls 68 and 70 and the electrodes 30 and 32. Optionally, in one embodiment, insulators 76 are also provided interior to the duct, providing an additional layer of insulation between the support sidewalls 68 and 70 and the metal flow within the duct 58. The insulators 76 extend from one electrode 30 to the other electrode 32 as shown in FIG. 6A. Insulators 73 insulate the bolt 72 from the copper bar and insulators 75 insulate the support sidewalls 68 and 70 at the edge regions from the copper electrodes 30 and 32.

As shown in FIG. 5, magnet 28 extends along the support sidewalls 68 and 70 to create a magnetic field within the duct 58. In one embodiment, pole pieces 60 and 62 are connected to the magnet 28 to focus the strength of the magnetic field into the duct as desired. Of course, the magnet 28 could be any type of acceptable magnet, such as a permanent magnet which may be made from rare earth metals, an electromagnet, or any other appropriate source of a magnetic field. Pole pieces 60 and 62 are preferred for focusing the strength intensity of the magnetic field through the duct in a desired pattern. However, as will be appreciated, the magnet may have a desired shape to provide this magnetic field intensity, or, alternatively, may be used without the pole pieces.

According to a preferred embodiment, the pole pieces 60 and 62 are closely adjacent the support walls 68 and 70, the dimensions being shown in FIGS. 5 and 6A not being exactly to scale. As previously explained with respect to FIG. 5 and elsewhere throughout this specification, the width of the electrodes 30 and 32 increases from the inlet to the outlet. Therefore, the distance between the pole pieces 60 and 62 also increases from the inlet to the outlet. The margin 28 is flat. According to a preferred embodiment, the pole pieces are tapered outward so that they are closely adjacent the duct at the inlet and remain closely adjacent the duct along the entire length of the duct even though the duct is expanding, as best shown in FIG. 5. That is, the pole piece 60 has a greater width adjacent the inlet 54 than at the outlet 56, the pole piece 60 being a tapering pole piece and the magnet 28 having a generally flat surface. In one embodiment, the pole piece 60 may taper along an arc of curvature to vary the magnetic field within the duct 58 according to a desired pattern.

Predictions from the computer program indicate that the third shape appears to be the most efficient.

Figure 6B:
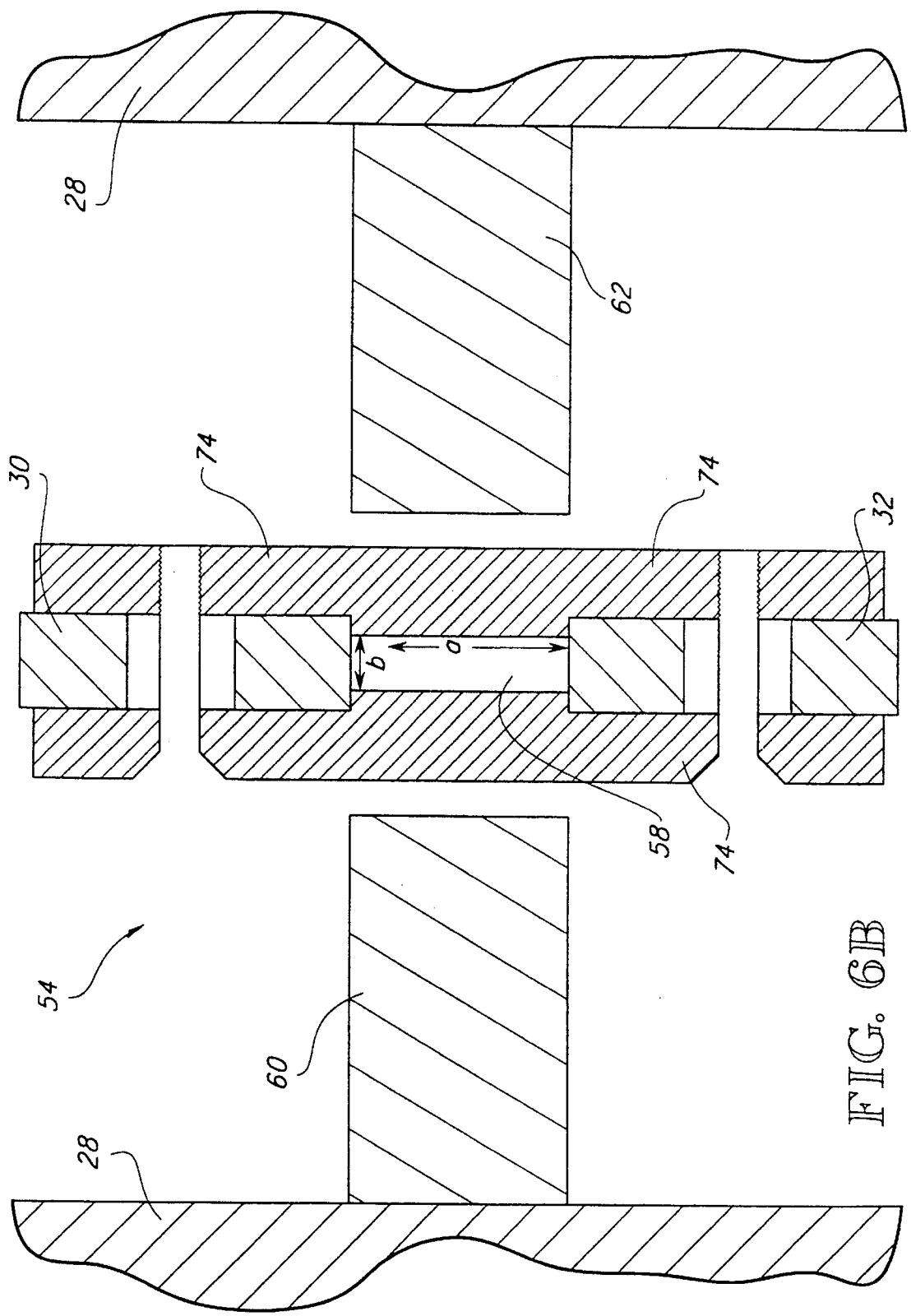
FIG. 6B is a cross-sectional view of a second embodiment taken along line 6—6 of FIG. 1 at the inlet of the generator section duct.

FIG. 6B is an alternative embodiment of the construction of the generator section. Similar to the embodiment of FIG. 6A, a magnet 28 having pole pieces 60 and 62 is adjacent a generator section 26. Preferably, the pole pieces have the same or less height as the duct 58. That is, the height (h) of the pole pieces 60 and 62 is equal to or less than the distance a between the electrodes. As a increases, the height h of the pole pieces also increases according to the same shape. Alternatively, the height h of the pole pieces 60 and 62 may be a linear increase, an arc of curvature increase, or a combination thereof. Generally, the height h of the pole pieces will not increase as rapidly as the distance a and thus h will be less than a at some positions. (In the embodiment at FIG. 6A, h is greater than a at some regions, for example, at the inlet, as shown.)

The structure of FIG. 6B uses an insulating wall assembly 74. A single member 74 (or two members 74) are formed of an electrically insulating material, such as a high density plastic, Teflon, PVC, or the like. They may be formed by machining or injection molding. Copper bars 30 and 32 forming the electrodes are press fit into the wall assembly 74 to complete the chamber and seal the duct 58. The electrodes 30 have air gaps at the regions through which bolts (not shown) extend to provide the insulation. The bolts may, if desired, also be constructed of plastic so that the air gap is not necessary. In one embodiment, the walls 74 are formed as an integral member. The gaps a and b are precisely defined by the mold used to form the integral member, as is the shape of the gaps. The electrodes 30 and 32 are press fit into the unitary member and retained by the friction force of the press fit. Bolts are optionally provided to retain the electrodes 30 and 32. Of course, a design combining some features of FIGS. 6A and 6B could also be used.

FIG. 7 indicates typical prediction results in the two-phase flow accelerating through the nozzle. a and b are the lateral dimensions of the nozzle. a increases in the first one-fifth of length of the nozzle. This is due to the "wedging out" of trailing edges of the injection elements in the mixer. However, decrease of the other dimension b compensates for increases in a, causing a decrease in cross-sectional area and a slightly favorable pressure gradient.

FIG. 7 also indicates that most of the contraction occurs near the outlet of the nozzle where the cross-section is the smallest. This is favorable from the point of view of minimizing residence time during which two-phase flow is at high void fraction. During this time, transient dynamic surface tension should exist due to surfactant concentration or temperature (heat transfer induced) differences. This transient dynamic surface tension should prevent coalescence of bubbles, thus maintaining a low slip bubbly flow pattern. For the dimensions given, at the nozzle inlet, pressure is 32.1 bars, while at the outlet it drops to about half (17.04 bars). Velocity increases from 1.7 to 82 m/s. Void fraction increases from 0.42 to 0.58. It should be relatively easy to obtain a bubbly flow pattern in the mixer entrance of a void fraction of 0.42 using known mixers. The temperature drops from 304.18 to 302.47K. If this were adiabatic expansion of a gas alone, the temperature drop would be about 60K.

FIG. 7 also show the predicted sonic velocity C. It changes from about 122 m/s at the inlet to 89 m/s at the outlet. This means that flow at the nozzle outlet is subsonic. This design was selected to not exceed sonic velocity. The question of advantages and disadvantages of running at supersonic, two-phase flow velocities can be addressed in more detail in the future.

Figure 9:
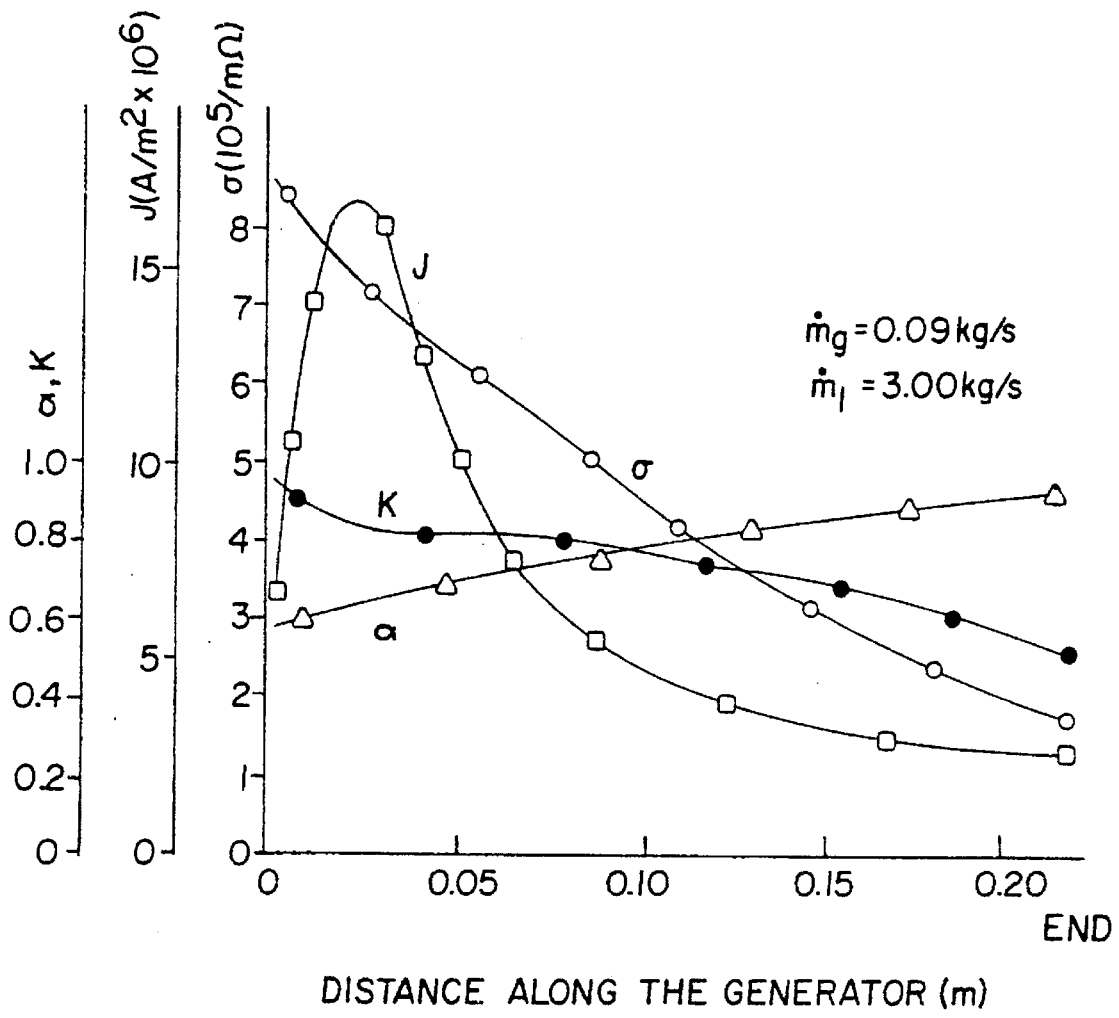

FIGS. 8 and 9 illustrate predicted streamwise development of flow parameters along the LMMHD generator from the inlet to the outlet for the sample generator section described herein. All values of the parameters at the nozzle exit are the same as at the entrance to the generator if no short channel is used. There may be some variation if a short channel between the nozzle and generator is present. External electrical load resistance of circuit connected to the generator is taken to be $R_L=0.00032\Omega$ as an example. The pressure decreases from in the range of 15.0 to 17.0 bars at the inlet to about 2.0 bars absolute at the outlet. The overall pressure (expansion) ratio through the nozzle and the generator exceeds 16. This is considerably higher than in any previous experiments, and should help in achieving a low slip bubbly flow pattern at high void fraction. Velocity changes from approximately in the range of 86 to 82 at the inlet, to about 21–22 m/s at the outlet. Most of the velocity decrease occurs in the inlet one third of the generator, within the non-linear expansion section.

Sonic velocity is shown as well, which changes from in the range of 85 to 95 to about 56 m/s at the outlet. The flow is completely subsonic. Temperature changes from about 303 down to 300.00K. There is a region near the inlet where temperature changes only slightly. It is believed that this is associated with large ohmic dissipation of local electric energy which is produced in good part by local conversion of the kinetic energy. FIG. 8 also shows the distance between the electrodes, "a". The distance (b) between the insulators 76, previously discussed, increases from 5 mm to 10 mm.

Void fraction increases steadily in the range of 0.58 to 0.6 up to 0.92. The load factor K more or less steadily decreases from in the range of 0.9 to 0.97 to about 0.5. For the inlet 40 percent of length of the generator where most of the power is converted, the local load factor exceeds 0.8. In the last part of the generator the local load factor is lower. This means that this part of generator is more "loaded" which somewhat decreases the generator efficiency. However, this part of the generator produces a relatively small amount of power due to locally low velocity, lower B field and lower electrical conductivity. On the other hand, having higher loading in this region does help to continue expansion to a high void fraction. Demonstration of the potential of achieving high void factions while maintaining low slip is a primary objective of the inventive LMMHD generator sections.

FIGS. 8 and 9 also shows that the electrical conductivity of the two-phase mixture decreases from $8.5 \times 10^5$ to $1.4 \times 10^5$ $1/\Omega m$. The electric current density is at a level of $5.6 \times 10^6$ at the generator inlet and then increases sharply to $12.3 \times 10^6$ and subsequently decreases to $2.0 \times 10^6$ $A/m^2$. Keeping in mind that the lateral distance between the insulating walls, b, increases by a factor of two from the inlet to the outlet of the generator.

The magnetic field intensity at the inlet is in the range of 1.7, increases to about 1.86 at about 2.5 cm from the inlet, and then decreases to about 1.2 at the outlet. This change occurs because the distance between pole pieces varies. The magnetic field may have other intensities, as desired.

Other results of this computer predictive experiment is that the electrical power output of the generator is in the range of 21,000–22,000 watts. Isentropic enthalpy drop is about 210 W (or 22540 W if ohmic heating by end region currents are excluded) while the kinetic energy change is 9671 W.

This translates to a predicted generator efficiency of 0.71, which is quite a respectable value for operation at high void fractions. Liquid flow pressure work is in the range of 5200 W. Ohmic degradation (dissipation) of mechanical into thermal energy is about 7631 W. Degradation by friction is about 1075 W. The actual enthalpy drop is 11170 W. It is lower than the isentropic enthalpy drop due to irreversibilities of ohmic and friction modes of energy degradation. Energy dissipated by ohmic heating in the inlet region is 909 W, while in the outlet end region is 601 W. The total predicted current output for this computer run is 8845 amps. This current includes currents which go to the inlet and the outlet end regions. The voltage difference between the electrodes is 2.65 volts.

FIGS. 10–18 illustrate the predicted values for the same factors as shown in FIGS. 8 and 9, except that the computer output and graphs are plotted from the exit to the inlet of the generator duct 58.

Figure 10:
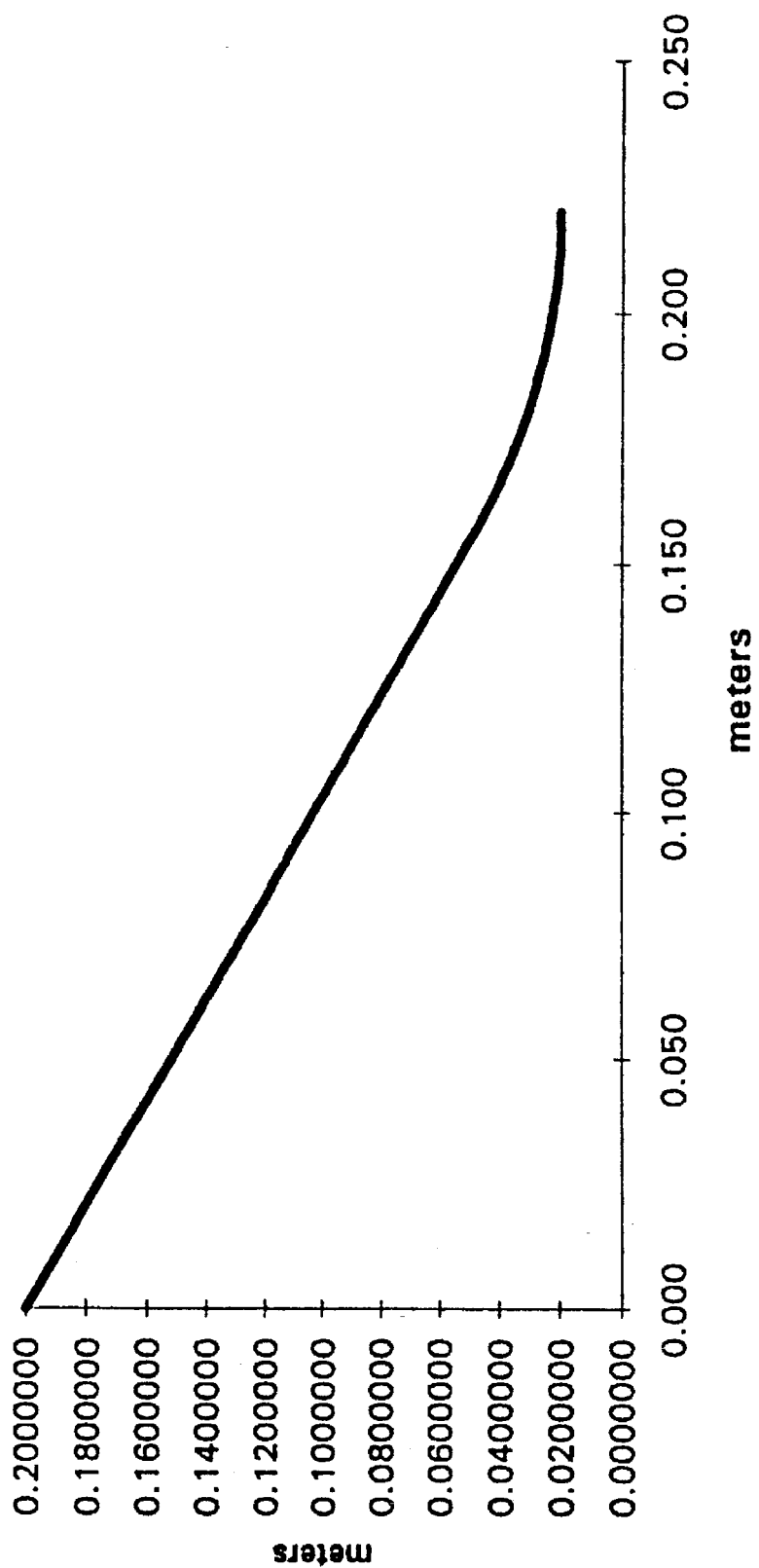
FIG. 10 is a graph showing the distance between the electrodes along the length of the generator section, from the exit to the entrance.
Figure 11:
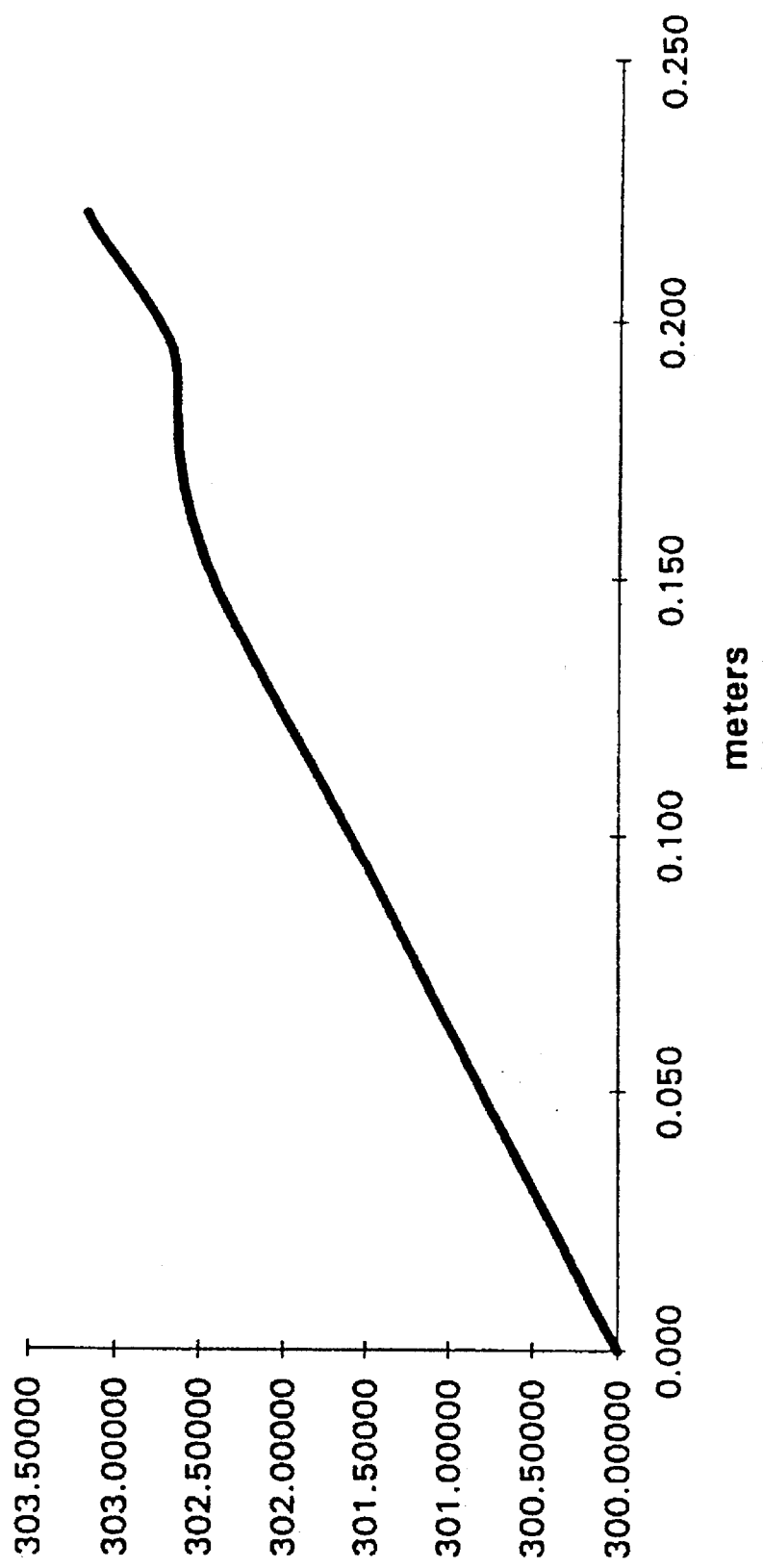
FIG. 11 is a graph illustrating the predicted temperature change along the length of the generator section, from the exit to the entrance.
Figure 12:
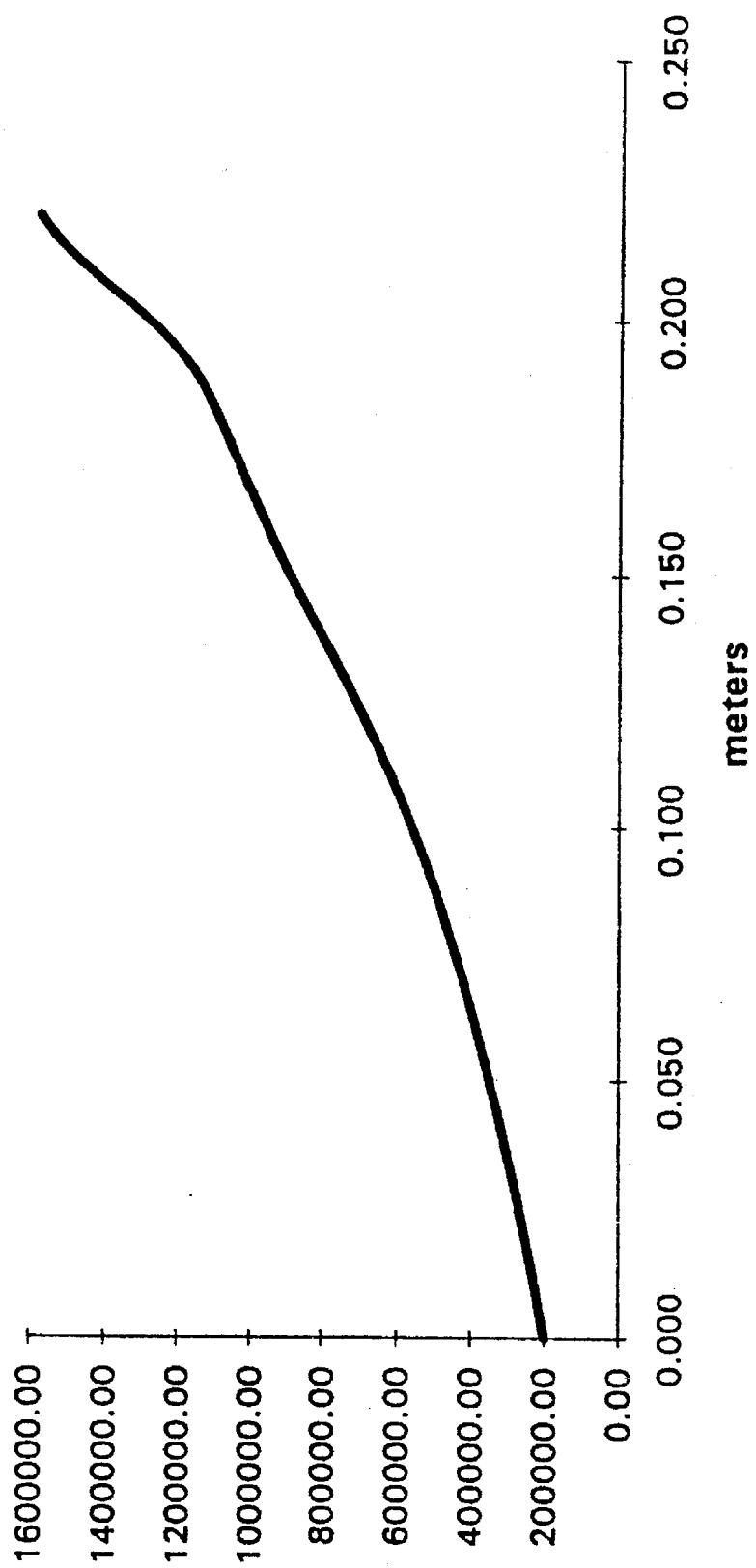
FIG. 12 is a graph illustrating the predicted pressure along the length of the generator section, from the exit to the entrance.
Figure 13:
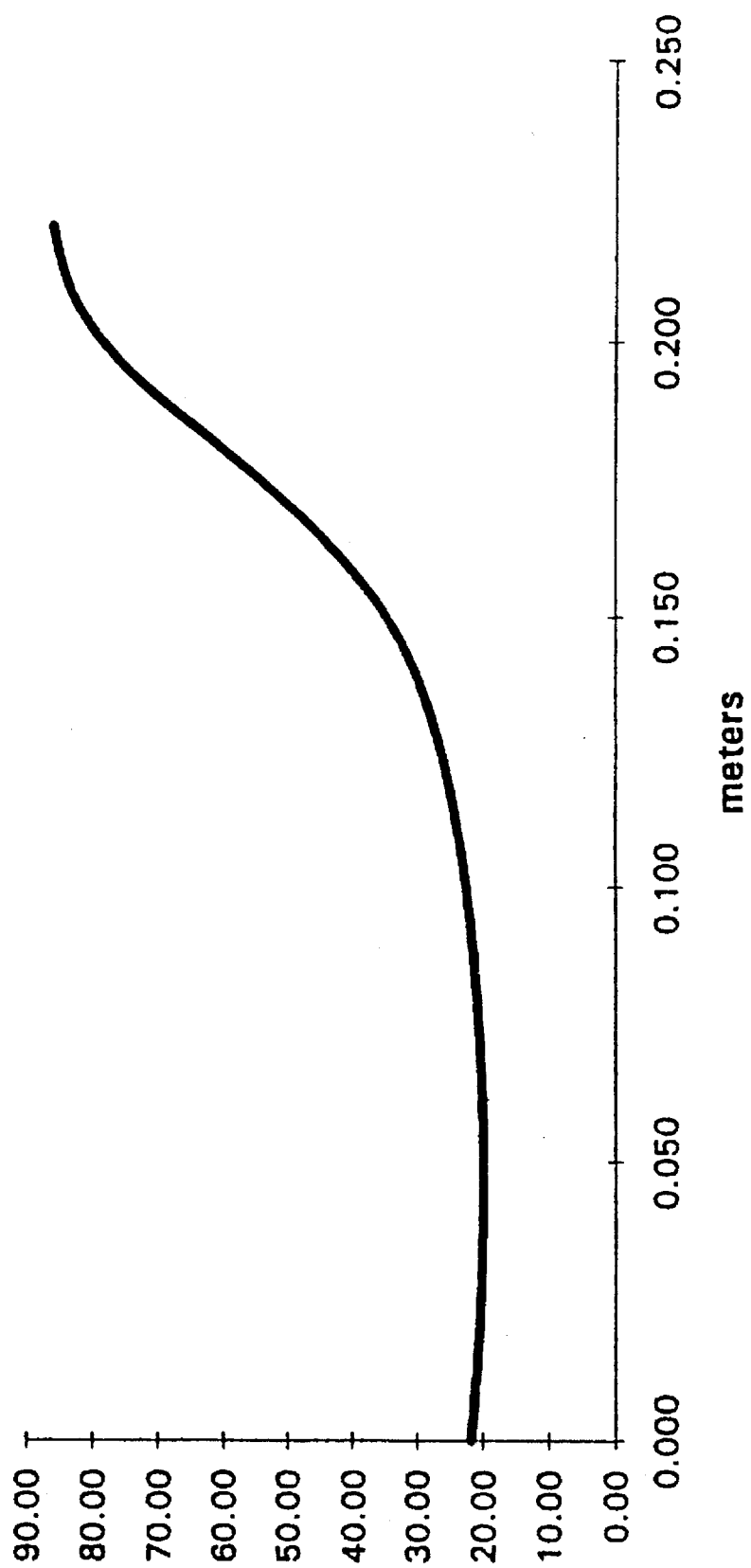
FIG. 13 is a graph illustrating the predicted average velocity of two-phase flow along the length of the generator section, from the exit to the entrance.
Figure 14:
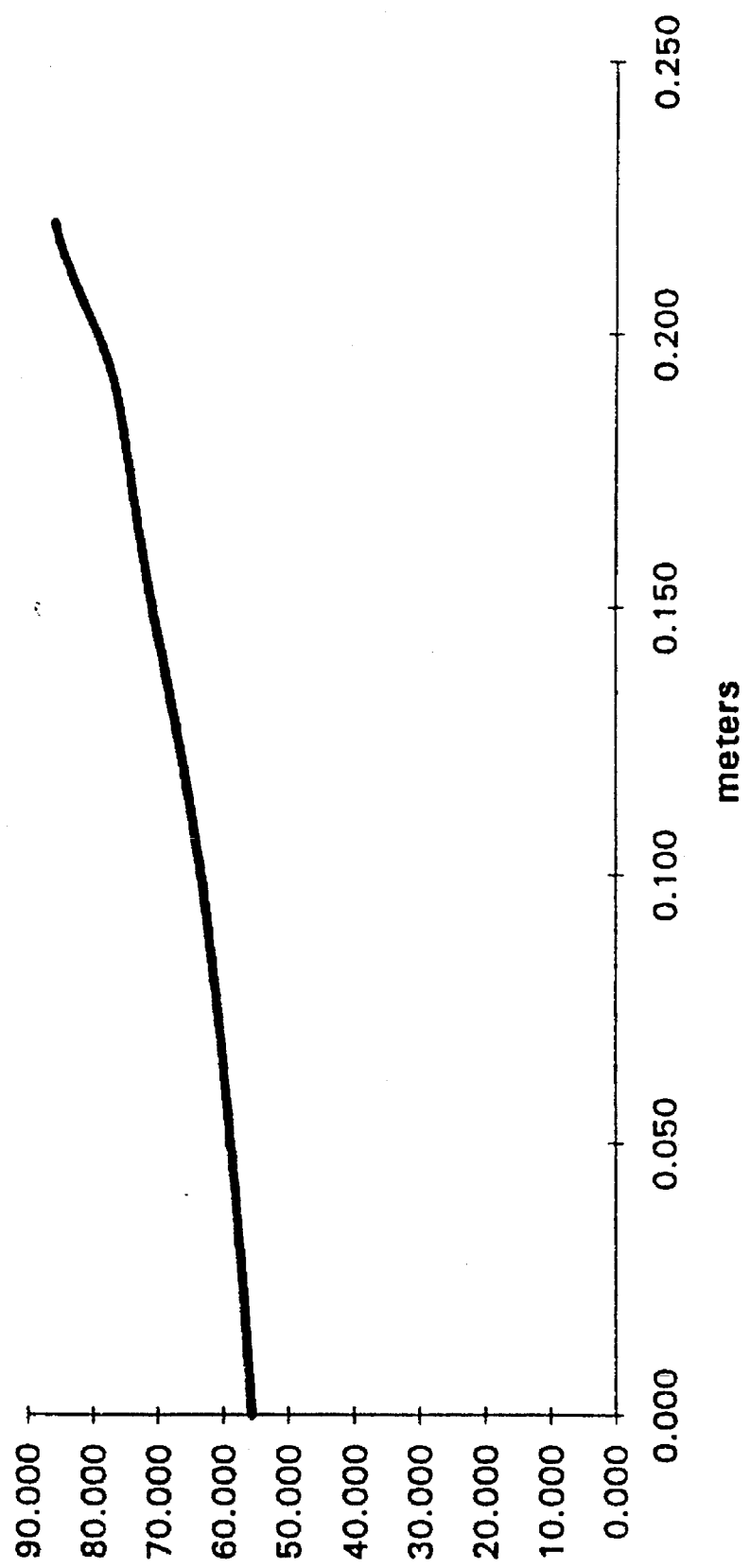
FIG. 14 is a graph illustrating the predicted sonic velocity along the length of the generator section, from the exit to the entrance.
Figure 15:
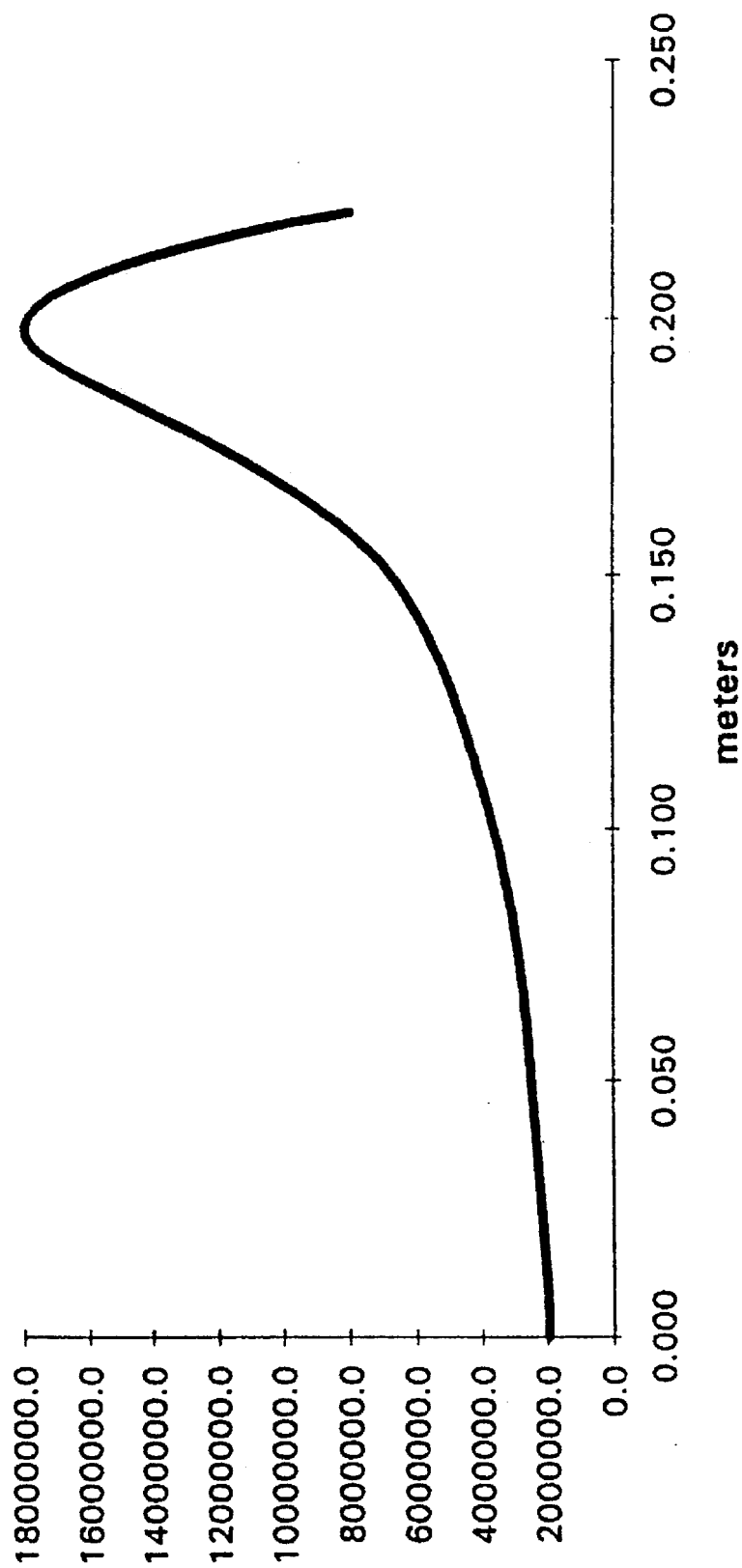
FIG. 15 is a graph illustrating the predicted electrical current density along the length of the generator section, from the exit to the entrance.
Figure 16:
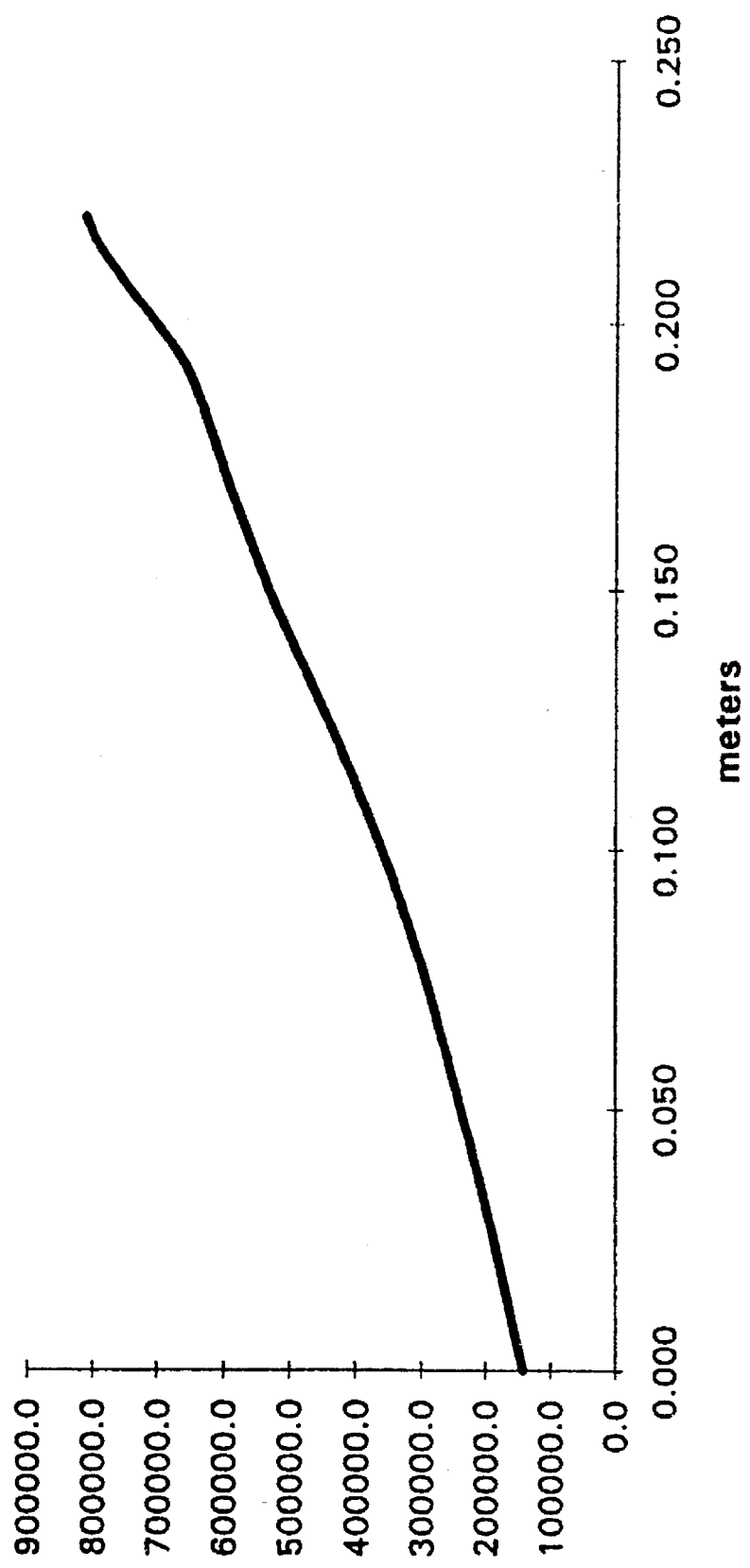
FIG. 16 is a graph illustrating the predicted electrical conductivity of the two-phase liquid along the length of the generator section, from the exit to the entrance.
Figure 17:
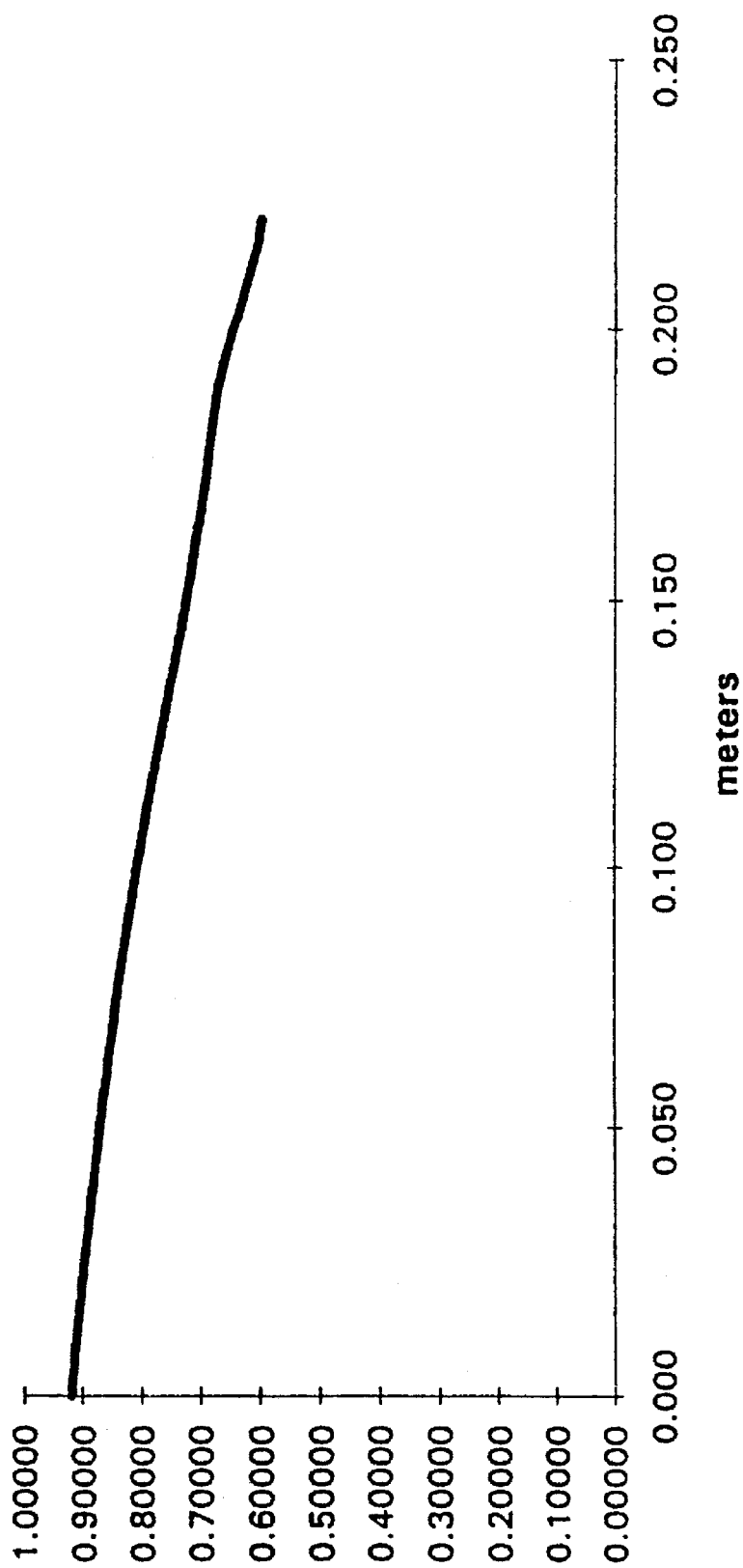
FIG. 17 is a graph illustrating the predicted void fraction along the length of the generator section, from the exit to the entrance.
Figure 18:
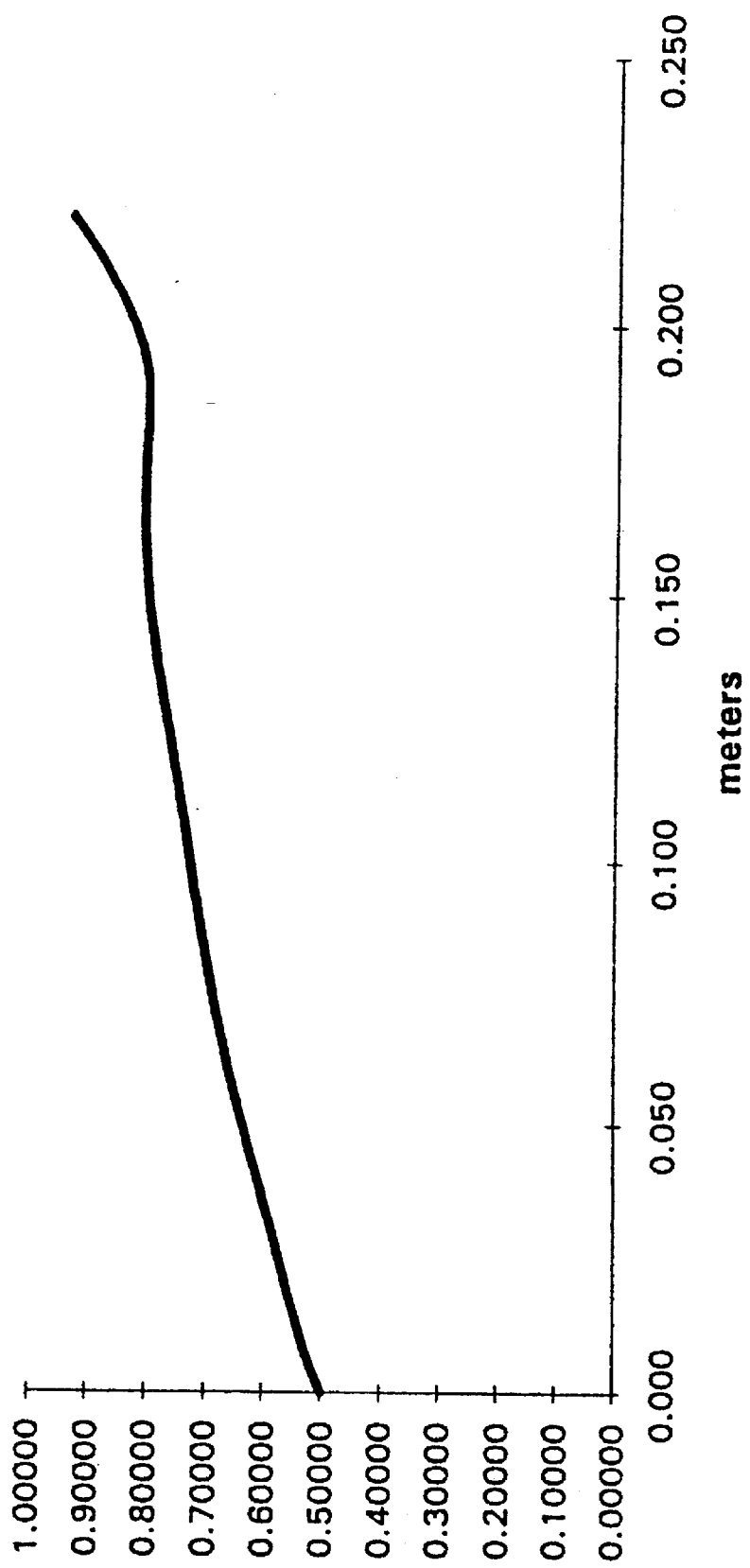
FIG. 18 is a graph illustrating the predicted load factor along the length of the generator section, from the exit to the entrance.
Figure 19A:
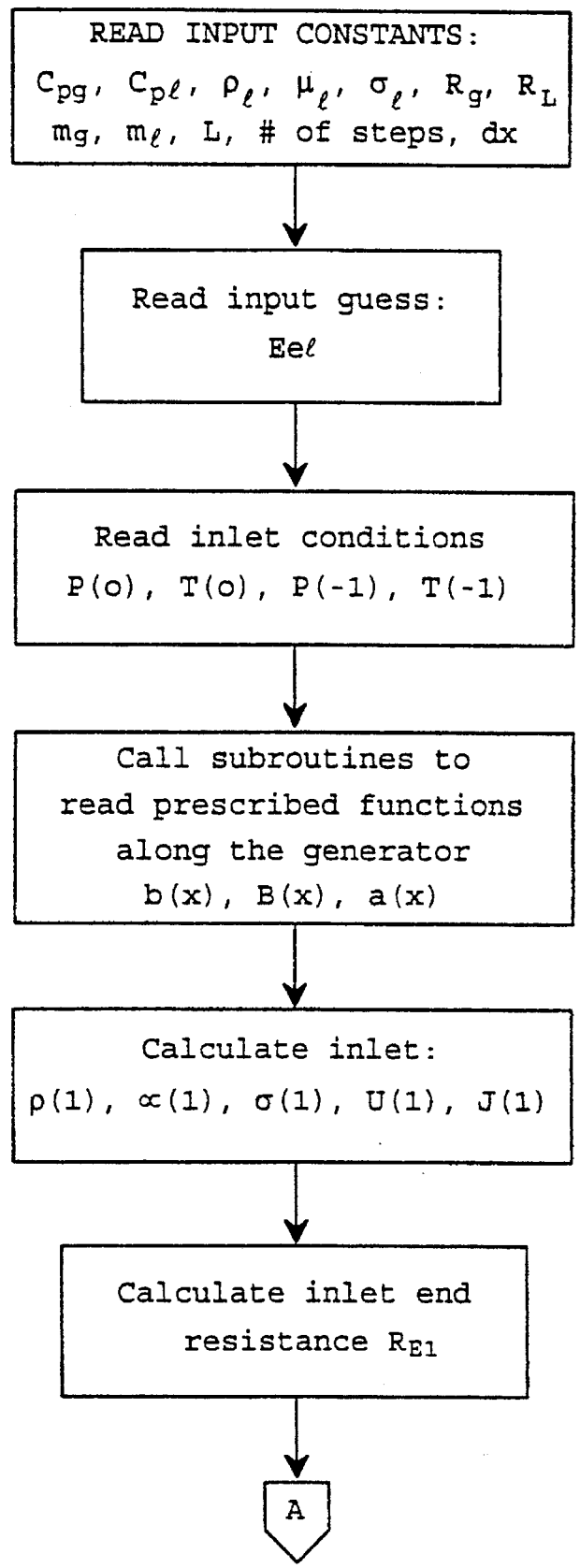
FIGS. 19A–19D are flow charts of the computer program used to predict the performance of the two-phase nozzle.
Figure 19B:
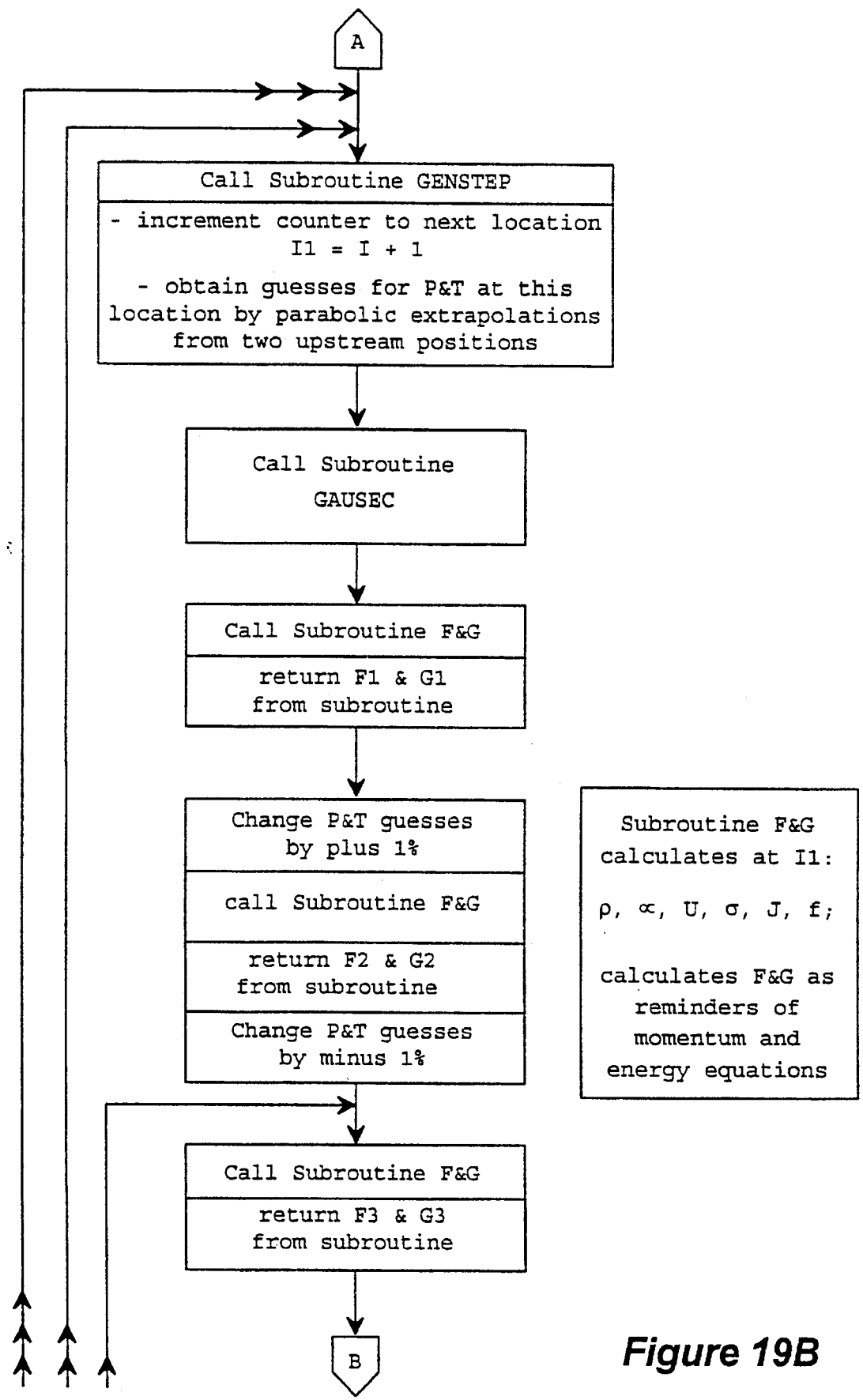
Figure 19C:
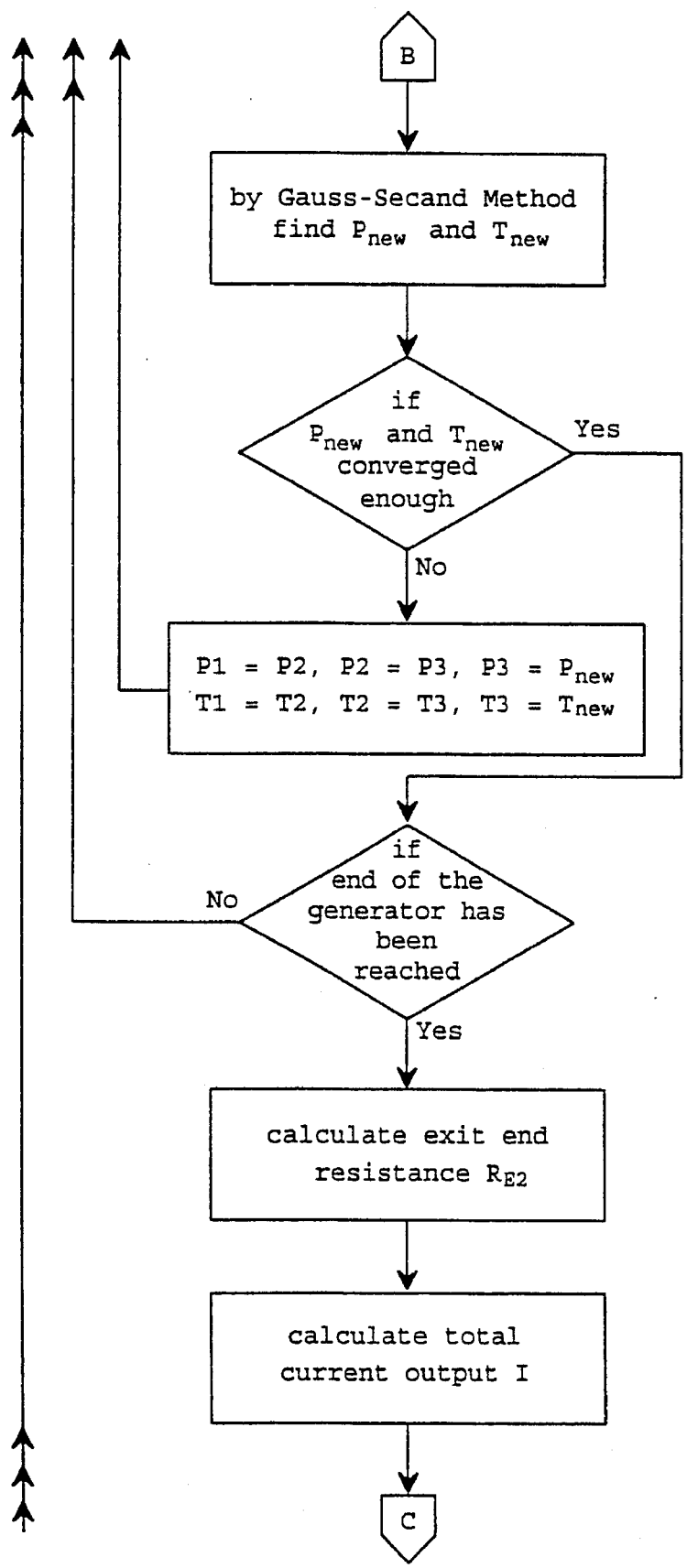
Figure 19D:
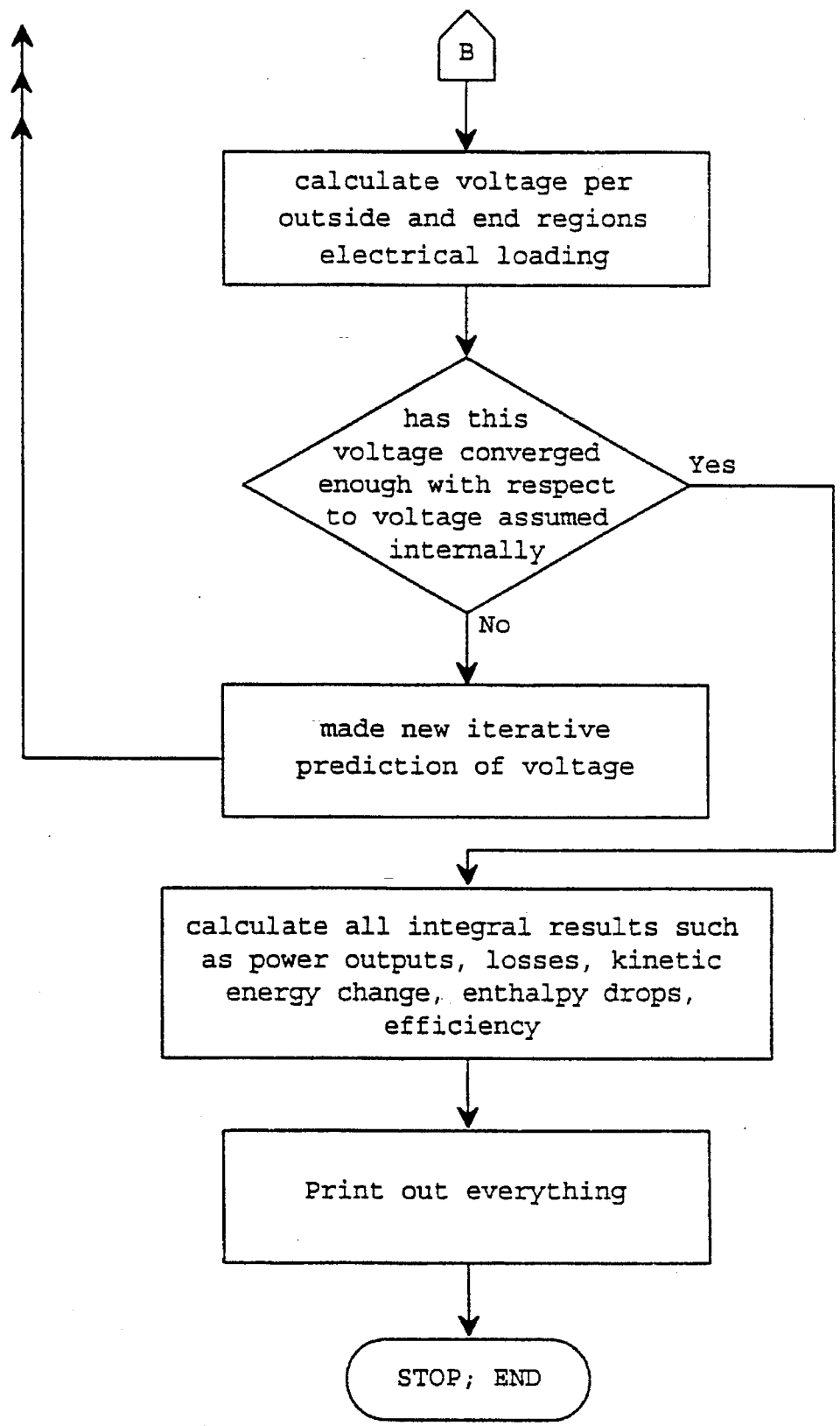

Viewing FIG. 10, the outlet of duct 58 is at point 0.0 meters and the distance between the electrodes is 0.20 meters. FIG. 10 is not a predicted output of the distance a. FIG. 10 is a graph showing the actual distance a as it will vary in the generator section as constructed using the electrodes 30 and 32 in the embodiment of FIG. 4–6B. Proceeding from the outlet to the inlet, the distance a between the walls narrows in a linear fashion for a selected distance. Then, at approximately 0.165 meters from the exit, transitions to a non-linear contraction region, as can be seen viewing FIG. 10. At the inlet, the graph of a is flat, showing that the distance a between the walls at the inlet is a constant.

The features shown in FIGS. 11–18 are predicted features as output from the calculations, as has been explained herein.

In summary, proper two-phase flow pattern is desired to be maintained as flow expands through the LMMHD generator. This can be achieved by utilizing the phenomena of transient surface activity which prevents coalescence of bubbles for a short period of time. In high expansion ratios, flow through an LMMHD generator substantial heat transfer from liquid to gas also creates favorable dynamic surface tension distribution which contributes to preventing the coalescence of bubbles as well.

Assumption of the no-slip condition is believed to be a good approximation of the actual physics as long as a bubbly or foam flow pattern exists.

Other assumptions are that there is perfect heat transfer between the two phases, i.e., their temperatures are identical, and that there is no heat transfer with the surroundings. Both of these are believed to be good approximations.

A complete set of governing equations can be solved numerically at a particular cross-section of the two-phase flow nozzle or LMMHD generator if desired. A complete solution at each point can be obtained by marching along the generator and then repeating the whole generator calculation while iterating for voltage until convergence is obtained.

Calculated output quantities include distributions along the generator of all important variables such as fluid velocity, temperature, pressure, void fraction, electrical conductivity, current density, local load factor, MHD friction and sonic velocity.

Some of the calculated integrated quantities are voltage drop, total current to the external load, inlet and outlet end resistances, isentropic enthalpy drop, actual enthalpy drop, total power input, electrical power output, generator efficiency, power losses to inlet and outlet and regions, energy degraded by ohmic heating by internal currents, and liquid flow work input.

Three generator shapes have been investigated numerically and described herein. In all of the three cases, the distance between the side wall 5 of the duct changes linearly from an inlet value to twice as large at the generator outlet. Distance between the electrodes expands 10 fold from the inlet to the outlet. Three different contours of the distances between the electrodes were investigated. A linear contour does not exhibit the preferred performance of the generator. The best performance for the described dimension and flow patterns appears to be with a contour which uses an arc of a circle with radius r=150 mm to avoid an abrupt change of the slope of the channel wall. This shape then transitions to a straight line.

Typical generator electrical power outputs are in the 20 kW range. The generator efficiencies exceed 70 percent. Void fraction for a typical case starts at 41 percent just downstream of the mixer, and due to expansion, reaches 92 percent at the exit of the generator.

| NOMENCLATURE | |
|---|---|
| A | cross-sectional area |
| a | local distance between electrodes |
| b | local distance between insulating walls |
| B | strength of applied magnetic field |
| $B_i$ | strength of induced magnetic field |
| $C_{pg}$ | specific heat of gas |
| $C_{pl}$ | specific heat of liquid |
| dx | differential of x |
| $E_{el}$ | voltage drop across the electrodes |
| f | MHD wall friction force per unit of length along generator |
| H | enthalpy of two-phase mixture |
| Ha | Hartmann number |
| J | electrical current density |
| K | local load factor |
| $K_G$ | overall load factor |
| l | overall length of the generator section |
| $m_g$ | mass flow rate of gas |
| $m_l$ | mass flow rate of liquid |
| p | pressure |
| Re | Reynolds number |
| $R_e$ | electrical resistance of generator's end regions |
| $R_i$ | internal electrical resistance of generator |
| $R_L$ | electrical resistance of external load |
| $T_g$ | temperature of gas |
| T | temperature |
| $T_l$ | temperature of liquid |
| U | average local velocity of two-phase flow |
| $U_g$ | velocity of gas |
| $U_l$ | velocity of liquid |
| v | specific volume |
| W | energy source term per unit of volume |
| x | local coordinate along the generator |
| $\propto$ | void fraction |
| $\nu$ | kinematic viscosity |
| $\rho$ | mixture density |
| $\rho_g$ | specific density of gas |
| $\rho_l$ | specific density of liquid |
| $\sigma$ | electrical conductivity of two-phase mixture |
| $\sigma_l$ | electrical conductivity of liquid |

An exemplary embodiment of an acceptable generator section shape and dimensions have been given as an example of a specific embodiment. Based on that embodiment, the predicted or anticipated values for various parameters have also been given. Of course, the values given are approximations only, and are based upon the assumptions which have been stated herein. In addition, they are based upon the exemplary embodiment of the third shape and size of the flow duct, having a nonlinear expansion region adjacent the inlet and a linear expansion region adjacent the outlet. Of course, an equivalent duct or generator section can be made which follows the principles of this invention but having a different shape, size, and flow parameters. For example, the specific parameters for the second shape having a circular arc of radius along one dimension from the inlet to the outlet would be somewhat different than those which have been provided herein based on predictions for the third shape. The generator section may be larger or smaller and still follow the teachings of the invention; the specific embodiment described herein is given as an example size only.

According to the principles of the present invention, the exact shape and size of the duct can be in numerous configurations, depending upon many factors including the overall size, the desired power output, the type of liquid metal used, and the like.

One distinct advantage of the invention as described herein is the small size of the generator section and overall system. As previously stated, the entire generator section has a total length in the range of ¼ meter. The magnetic need not exceed the size of the generator section and thus can be smaller than prior magnets. The nozzle and the generator section together have a total length in the range of approximately ½ meter. The entire LMMHD generator may have a total length less than 5 meters, and in some embodiments under 2 meters.

The unique aspects of the invention as explained herein permit an LMMHD generator to be constructed on a much smaller scale than previously possible and yet with high enough efficiency that it provides a low-cost energy source for use in numerous environments, including home use, local neighborhood use, or use by local power companies. Heretofore, LMMHD generators have been relatively cumbersome and expensive, and have not, up until now, been characterized by low-cost, high-efficiency operation for the generation of electricity. However, according to principles of the present invention, the secondary heat from other power sources such as from a coal fired cogeneration electric power plant, a oil fired cogeneration electric power plant, or even a low horsepower operating internal combustion engine including an automobile engine, may provide the input heat energy as a byproduct from their normal operation, which may be converted to electricity Using an LMMHD generator constructed according to principles of the present invention.

I claim:

1. A generator section assembly for use in a liquid metal magnetohydrodynamic electricity generator comprising:

a duct for enclosing a two-phase fluid flow, including a liquid metal and a gas, the duct having an inlet and an outlet;

a pair of sidewalls that form two walls of the duct, the distance between the two sidewalls increasing linearly from the inlet towards the outlet;

a pair of electrodes that form two opposing walls of the duct and are positioned for contacting with the two-phase flow, each of the pair of electrodes having a surface region forming a wall of the duct having a shape of a circular arc of radius from the inlet of the duct towards the outlet of the duct to form a duct having a non-linear increase in the distance between the pair of electrodes from the inlet of the duct towards the outlet of the duct, thus providing a non-linear expansion region within the duct as the distance between the pair of electrodes that form a walls of the duct increases non-linearly, the duct thus expanding linearly along one dimension and non-linearly along the other dimension; and a magnetic field generating means for creating a magnetic field within the two-phase flow to generate electricity as the two-phase flow passes through the magnetic field within the non-linear expansion region of the duct.

2. The generator section assembly according to claim 1 wherein the magnetic field generating means includes a permanent magnet having pole pieces, the pole pieces being positioned adjacent the sidewalls of the duct.

3. The generator section assembly according to claim 2 wherein the distance between the pole pieces increases linearly from the inlet towards the outlet.

4. The generator section assembly according to claim 1 wherein the slope of increase of the distance between the sidewalls is between the range of 1 to 30 and 1 to 50.

5. The generator section assembly according to claim 4 wherein the slope of increase of the distance between the sidewalls is approximately 1 to 40, such that the distance between the sidewalls increases 1 unit of measure when the length increases 40 units of measure.

6. The generator section according to claim 5 wherein the distance between the sidewalls at the inlet is approximately 0.5 centimeters and the distance between he sidewalls at the exit is approximately 1 centimeter for a duct having a length of 22 centimeters.

7. The generator section according to claim 1 wherein the sidewalls include at least two members, a support member and an electrical insulating member, the insulating member being between the support member and the two-phase flow to prevent electrical contact between the liquid metal and sidewall support member.

8. The generator section according to claim 7 wherein each sidewall support member extends as a unitary member from one electrode of the pair to the other electrode of the pair and a bolt extends through one sidewall support member, through one sidewall insulating member, through one electrode of the pair, through the other sidewall insulating member, and through the other sidewall support member to clamp the pair of electrodes between the sidewall support members and form the four walls of the duct.

9. The generator section assembly according to claim 1 wherein each of the pair of electrodes has a shape of a circular arc of radius extending the entire length of the duct from the inlet to the outlet, providing a non-linear expansion region for the entire length of the duct from the inlet to the outlet.

10. The generator section assembly according to claim 1 wherein each of the pair of electrodes has a shape of a circular arc of radius extending from the inlet for only a portion of the duct towards the outlet and having a shape of linear expansion from the arc portion to the end of the duct, providing a non-linear expansion region for only a portion of the duct that is adjacent the inlet and a linear expansion a portion of the duct that is adjacent the outlet.

11. The generator section assembly according to claim 1 further including a nozzle section forward of the generator section, the nozzle section having a decreasing cross-sectional area prior to the inlet of the duct for increasing the speed of a two-phase flow through the inlet of the duct.

12. A duct for use in a electrical generator section comprising:

four walls forming the enclosure for the duct;

an inlet region of the duct;

an outlet region of the duct; and a non-linear expansion of the duct from the inlet to the outlet that is created by the distance between at least two of the walls increasing non-linearly from the inlet towards the outlet, the non-linear expansion of the duct being created by two curving walls of the duct each having a circular arc of radius adjacent the inlet of the duct and the distance between the walls increasing towards the outlet of the duct, the arc of the curvature of the walls being selected such that the shape of the curving walls is an arc that extends along only a portion of the duct and the shape of the curving walls from the end of the arc shape to the outlet of the duct is a linearly increasing shape.

13. The duct according to claim 12 wherein the distance between the other two of the four walls increase linearly from the inlet to the outlet.

14. The duct according to claim 12 further including electrodes positioned for being in contact with the interior of the duct to permit electricity generated with the duct to be transferred outside of the duct.

15. The duct according to claim 14 wherein the curving walls are the electrodes.

16. A generator section assembly for use in a liquid metal magnetohydrodynamic electricity generator comprising:

a duct for enclosing a two-phase fluid flow, including a liquid metal and a gas, the duct having an inlet and an outlet;

a first pair of sidewalls that form two walls of the duct; and a second pair of sidewalls that form two opposing walls of the duct and are positioned for being in contact with the two-phase flow, each of the second pair of sidewalls having a shape of a circular arc of radius for a portion of their length from the inlet of the duct towards the outlet of the duct and an angled region that extends at a selected angle from the end of the arc region to the outlet of the duct to form a duct having a non-linear expansion region for a portion adjacent the inlet and a linear expansion region for a portion adjacent the outlet.

17. The generator assembly according to claim 15 wherein the second pair of sidewalls are electrodes that each extend as a unitary member along the entire length of the duct, the shape of the electrodes being a circular arc of radius for a portion and being a straight, angled shape for a portion.

18. The generator assembly according to claim 17 wherein the distance between the first pair of sidewalls increases linearly from the inlet to the outlet.

19. The generator section according to claim 18 wherein the width of the electrodes increase from the inlet to the outlet.

20. The generator section according to claim 16 further including:

a magnetic field generating means for creating a magnetic field within the liquid metal to generate electricity as the liquid metal passes through the magnetic field within the non-linear expansion region of the duct.

21. A generator section assembly for use in a liquid metal magnetohydrodynamic electricity generator comprising:

a duct for enclosing a two-phase fluid flow, including a liquid metal and a gas, the duct having an inlet and an outlet;

a pair of sidewalls that form two walls of the duct;

a pair of electrodes that form two opposing walls of the duct and are positioned for contacting with the two-phase flow, each of the pair of electrodes having a surface region forming a wall of the duct having a shape of a circular arc of radius from the inlet of the duct towards the outlet of the duct to form a duct having a non-linear increase in the distance between the pair of electrodes from the inlet of the duct towards the outlet of the duct, thus providing a non-linear expansion region within the duct as the distance between the pair of electrodes that form a walls of the duct increases non-linearly;

a magnetic field generating means for creating a magnetic field within the two-phase flow to generate electricity as the two-phase flow passes through the magnetic field within the non-linear expansion region of the duct; and a nozzle section forward of the generator section, the nozzle section having a decreasing cross-sectional area prior to the end of the duct for increasing the speed of a two-phase flow through the inlet of the duct.

* * * * *

UNITED STATES PATENT AND TRADEMARK OFFICE
CERTIFICATE OF CORRECTION

PATENT NO.    : 5,614,773
DATED         : March 25, 1997
INVENTOR(S)   : Gracio Fabris It is certified that error appears in the above identified patent and that said Letters Patent is hereby corrected as shown below:

In column 18, claim 17, line 19, please delete "15" and insert therefor --16--.

Signed and Sealed this

Twenty-second Day of July, 1997

Attest:

BRUCE LEHMAN

*Attesting Officer*　　　　Commissioner of Patents and Trademarks